US012712833B1

(12) United States Patent
Allen et al.

(10) Patent No.: US 12,712,833 B1
(45) Date of Patent: Aug. 18, 2026

(54) PRIVATE INFERENCE FOR GENERATIVE ARTIFICIAL INTELLIGENCE SYSTEMS

(71) Applicant: OpenAI OpCo, LLC, San Francisco, CA (US)

(72) Inventors: Matthew Allen, Menlo Park, CA (US); Jennifer Malia Andrus, London (GB); Madelaine Boyd, San Francisco, CA (US); Athyuttam Eleti, San Francisco, CA (US); Saachi Jain, Los Gatos, CA (US); Wanning Jiang, Los Altos, CA (US); Ian Kivlichan, San Francisco, CA (US); Jonathan Millican, London (GB); Benjamin Newhouse, San Francisco, CA (US); Eric Northup, Seattle, WA (US); Nicholas Preston, San Francisco, CA (US); Ryan Ragona, Seattle, WA (US); Sai Deep Tetali, Newark, CA (US); Yi Xu, San Bruno, CA (US); Jieqi Yu, Alameda, CA (US); Grace Zhao, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/543,696

(22) Filed: Feb. 18, 2026

(51) Int. Cl.
*H04L 51/04* (2022.01)
*H04L 9/08* (2006.01)
(Continued)

(52) U.S. Cl.
CPC ............ *H04L 51/04* (2013.01); *H04L 9/0819* (2013.01); *H04L 51/02* (2013.01); *H04L 51/216* (2022.05)

(58) Field of Classification Search
None
See application file for complete search history.

(56) References Cited

U.S. PATENT DOCUMENTS

| | | | | |
|---|---|---|---|---|
| 12,400,074 | B1 * | 8/2025 | Levine | G06F 40/20 |
| 12,591,766 | B1 * | 3/2026 | Coffey | G06N 3/0475 |

(Continued)

FOREIGN PATENT DOCUMENTS

| | | | | |
|---|---|---|---|---|
| WO | WO-2026018276 A1 * | 1/2026 | | G06F 21/53 |

OTHER PUBLICATIONS

Anthropic & Pattern Labs. "Confidential Inference Systems—Design principles and security risks" Anthropic.com, Version 1.0, Jun. 2025, 32 pages. <URL: https://assets.anthropic.com/m/c52125297b85a42/original/Confidential_Inference_Paper.pdf.

(Continued)

*Primary Examiner* — June Sison
(74) *Attorney, Agent, or Firm* — Keller Preece PLLC

(57) ABSTRACT

The present disclosure relates to systems, non-transitory computer-readable media, and methods for executing generative models for private conversations within protected inference environments. In particular, in some embodiments, the disclosed systems receive an encrypted chat message marked with a private status. In addition, in some embodiments, the disclosed systems generate a decrypted chat message by decrypting the encrypted chat message using a shared session key based on a hardware-backed attestation indicating server-side processing by a trusted execution environment. Moreover, in some embodiments, the disclosed systems generate a re-encrypted chat message by re-encrypting the decrypted chat message with an additional session key established for a private engine instance. Furthermore, in some embodiments, the disclosed systems utilize the private engine instance operating in a confidential container to decrypt the re-encrypted chat message and initiate a generative model to generate a response corresponding to the encrypted chat message marked with the private status.

20 Claims, 13 Drawing Sheets

(51) Int. Cl.
*H04L 51/02* (2022.01)
*H04L 51/216* (2022.01)

(56) References Cited

U.S. PATENT DOCUMENTS

| | | | | |
|---|---|---|---|---|
| 12,596,764 | B1 * | 4/2026 | Agrawal | G06F 16/9574 |
| 2021/0328787 | A1 | 10/2021 | Grieder et al. | |
| 2023/0269093 | A1 * | 8/2023 | Ben-Ari | H04L 9/0897 713/175 |
| 2024/0061938 | A1 * | 2/2024 | Briongos | G06F 21/57 |
| 2024/0283664 | A1 | 8/2024 | Islam et al. | |

OTHER PUBLICATIONS

Antrhopic Announcements. “Confidential Inference via Trusted Virtual Machines”, Anthropic PBC. Jun. 18, 2025, 9 pages. <URL: https://www.anthropic.com/research/confidential-inference-trusted-vms>.

Apple Security Engineering and Architecture (SEAR), User Privacy, Core Operating Systems (Core OS), Services Engineering (ASE), and Machine Learning and AI (AIML). “Private Cloud Compute—A new frontier for AI privacy in the cloud”, Apple Security Research Blog. Jun. 10, 2024, 6 pages, Retrieved from the Internet on Mar. 11, 2026: <URL:https://security.apple.com/blog/private-cloud-compute/>.

Confident Security. “Don’t Trust, Verify”, Confident. Security, San Francisco, CA, 10 pages, 2025. Retrieved from the Internet on Mar. 11, 2026: <URL: https://confident.security/>.

Confidential Containers. “Deploy Cloud Native Applications Inside Confidential Enclaves”, Confidential Containers Contributors. 2026, 3 pages, Retrieved from the Internet on Mar. 11, 2026: <URL: https://confidentialcontainers.org/>.

Dan Biderman, Avanika Narayan and Chris Ré, “Mind the Trust Gap: Fast, Private Local-to-Cloud LLM Chat”, Hazy Research, May 12, 2025, 12 pages. <URL:https://hazyresearch.stanford.edu/blog/2025-05-12-security>.

Engineering at Meta. “Building Private Processing for AI tools on WhatsApp”, Meta, Security & Privacy. Apr. 29, 2025, 9 pages. <URL: https://engineering.fb.com/2025/04/29/security/whatsapp-private-processing-ai-tools/>.

Engineering at Meta. “How WhatsApp enables multi-device capability”, Meta, Security & Privacy. Jul. 14, 2021, 5 pages. <URL: https://engineering.fb.com/2021/07/14/security/whatsapp-multi-device/>.

Jay Yagnik, “Private AI Compute: our next step in building private and helpful AI”, Google, The Keyword, Innovation & AI, Products. Nov. 11, 2025, 4 pages. <URL: https://blog.google/innovation-and-ai/products/google-private-ai-compute/>.

Meta. “Private Processing for WhatsApp Overview—Technical White Paper and Security Guide”, ai.meta.com, V1, Jun. 10, 2025, 51 pages. <URL:https://ai.meta.com/static-resource/private-processing-technical-whitepaper>.

Meta. “The Labyrinth Encrypted Message Storage Protocol” Engineering at Meta. Dec. 6, 2023, 41 pages, <URL: https://engineering.fb.com/wp-content/uploads/2023/12/TheLabyrinthEncryptedMessageStorageProtocol_12-6-2023.pdf>.

Microsoft Learn—Azure. “Azure Confidential VM options”, Microsoft. Last updated on Sep. 3, 2025, 4 pages. <URL: https://learn.microsoft.com/en-us/azure/confidential-computing/virtual-machine-options>.

Privatemode. “The always encrypted AI service”, Privatemode AI, Edgeless Systems GmbH, 2026, 9 pages, Retrieved from the Internet on Mar. 11, 2026: <URL: https://www.privatemode.ai/>.

Sigstore. “Sign. Verify. Protect”, Sigstore.dev, The Linux Foundation. 2026, 5 pages, Retrieved from the Internet on Mar. 11, 2026: <URL: https://www.sigstore.dev/>.

* cited by examiner

PRIVATE INFERENCE FOR GENERATIVE ARTIFICIAL INTELLIGENCE SYSTEMS

BACKGROUND

Generative artificial intelligence (AI) systems are increasingly used to support interactive conversations between client devices and remote computing systems. Such systems commonly receive user input, process the input using one or more machine-learning models, and return generated responses to the client device. As these systems are deployed at scale, they often operate within distributed computing environments that involve multiple software components, execution contexts, and data storage systems.

In many existing generative AI systems, user inputs, intermediate representations, and generated responses may be handled in plaintext form by multiple components of a server-side computing environment. Such components can include application logic, model-serving infrastructure, monitoring or logging services, and data storage systems involved in processing or retaining conversational data. As a result, sensitive content associated with user interactions may be accessible beyond the specific components required to perform inference, reducing data security and increasing the scope of data exposure within the system. Additionally, practices such as retaining conversation history for continuity or analysis may further extend the duration and locations in which private content exists in plaintext form, complicating efforts to constrain access to such information.

Moreover, generative AI systems may be subject to safety-related considerations arising from the potential generation of content that is inappropriate, harmful, or restricted by policy. In existing systems, safety analysis may be performed using separate classification or moderation components that operate before or after model inference. Such components may examine user inputs, intermediate data, or generated outputs to determine whether additional handling is required. Depending on system design, safety-related processing may involve transmitting portions of conversational content to external services or storing content for review, which can introduce additional complexity in how content is handled and governed within the overall system. Moreover, coordinating safety analysis with real-time inference can present challenges in ensuring consistent treatment of content across different processing stages.

These along with additional problems and issues exist with regard to existing generative artificial intelligence systems.

BRIEF SUMMARY

Embodiments of the present disclosure provide benefits and/or solve one or more of the foregoing or other problems in the art with systems, non-transitory computer-readable media, and methods for executing generative artificial intelligence models on private conversational data within protected inference environments. In one or more embodiments, the disclosed systems enable processing of conversational content by a generative AI system under privacy-preserving and safety-aware conditions. For instance, in one or more embodiments, the disclosed systems receive encrypted chat messages from a client device, decrypt the chat messages for authorized processing within a trusted execution environment, and execute a generative model within the trusted execution environment to produce responses, all while confining plaintext access to protected execution contexts. Moreover, in one or more embodiments, the disclosed systems support re-encryption of data between processing stages, encryption of chat messages for encrypted storage of private chat history using client-controlled encryption keys, and controlled background processing of stored data. In certain embodiments, the disclosed systems integrate safety classification operations with inference to conditionally handle content based on predefined criteria, and the disclosed systems may transition between private and non-private processing modes according to eligibility criteria with user notification and consent.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

This disclosure describes one or more embodiments of a private inference system that executes generative artificial intelligence models on private conversational data within protected inference environments. More particularly, the private inference system enables processing of conversational content by a generative AI system under privacy-preserving and safety-aware conditions. For instance, in one or more embodiments, the private inference system receives encrypted chat messages from a client device, decrypts the chat messages for authorized processing within a trusted execution environment, and executes a generative model within the trusted execution environment to produce responses, all while confining plaintext access to protected execution contexts to ensure that no human can access the plain text of a conversation. Moreover, in one or more embodiments, the private inference system supports re-encryption of data between processing stages, encryption of chat messages for encrypted storage of private chat history using client-controlled encryption keys, and controlled background processing of stored data. In certain embodiments, safety classification operations may be integrated with inference to conditionally handle content based on predefined criteria, and the private inference system may transition between private and non-private processing modes according to eligibility criteria with user notification and consent. The private inference system can also support dynamic fallback between private and public execution environments for feature support.

Figure 1:
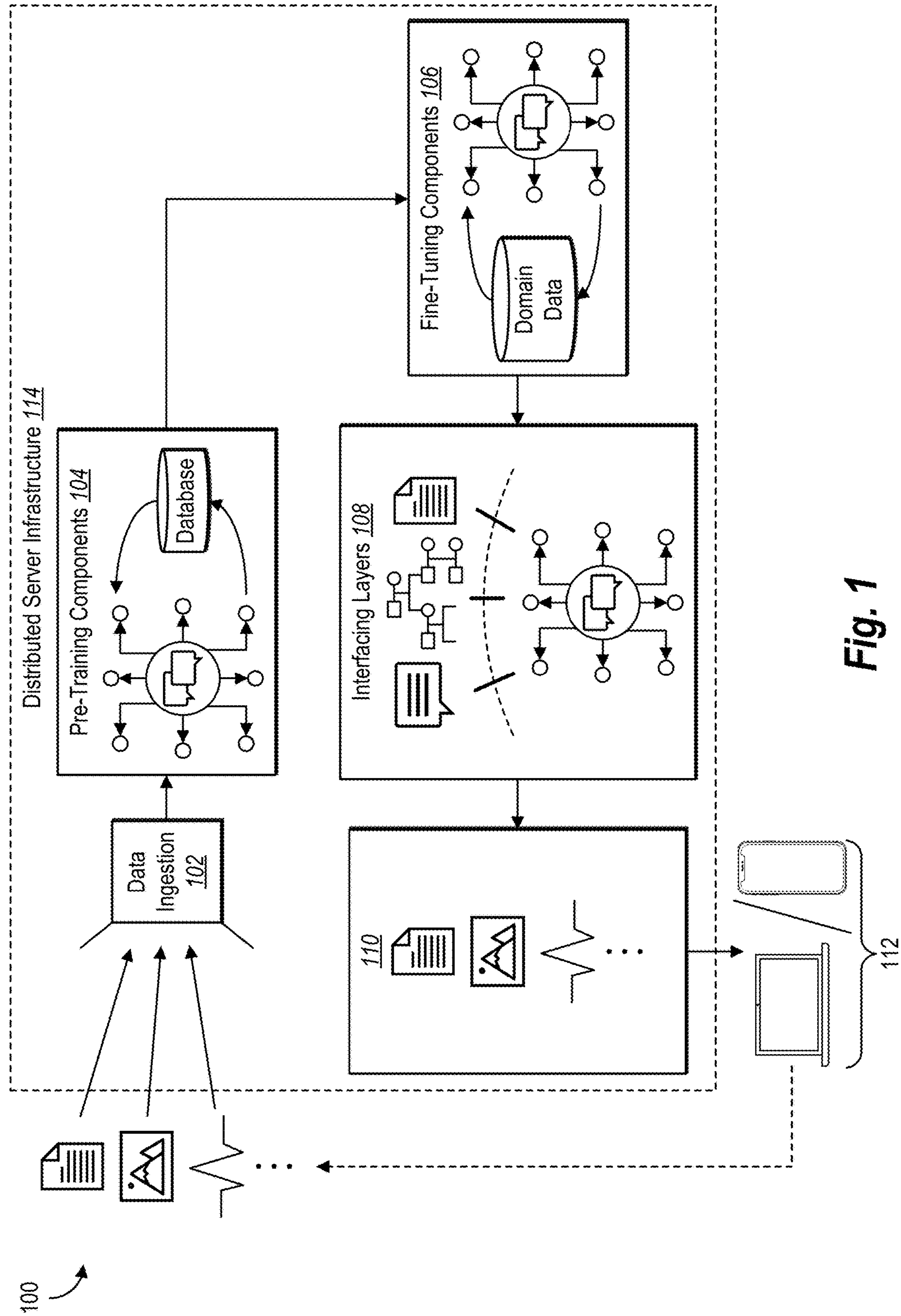
FIG. 1 illustrates a high-level architecture of a generative artificial intelligence system for implementing large language models and other generative models in accordance with one or more embodiments.

FIG. 1 illustrates a high-level architecture of a generative artificial intelligence ("AI") system 100 for implementing large language models and other generative models to enable natural language processing, conversational interfaces, multimodal content generation, and analysis in accordance with one or more embodiments. The generative AI system 100 may include data ingestion pipelines 102, pre-training components 104, fine-tuning components 106, interfacing layers 108, and supporting hardware in the form of a distributed server infrastructure 114.

The data ingestion pipelines 102 of the generative AI system 100 may receive and preprocess large volumes of structured and unstructured data, including text corpora, image datasets, video datasets, and audio datasets, to support diverse generative model training. Preprocessing may include deduplication, tokenization, normalization, feature extraction (e.g., spectrogram generation for audio), and content safety filtering, preparing data for effective distributed training across server devices.

The pre-training components 104 of the generative AI system 100 may utilize transformer-based architectures for LLMs, as well as additional generative models such as diffusion models for image generation, autoencoders for representation learning, and multimodal transformer models for cross-domain generation tasks. These models may be configured with deep neural network stacks to capture hierarchical, semantic, and contextual relationships within the data.

The generative AI system 100 may employ diffusion models for image and video generation, where the models learn to iteratively denoise random noise into structured outputs conditioned on textual or other modality inputs. The generative AI system 100 may train these models using score-based or denoising diffusion probabilistic methods across distributed server devices within the distributed server infrastructure 114.

The generative AI system 100 may also implement speech generation models, including text-to-speech (TTS) systems using autoregressive or non-autoregressive architectures, and audio diffusion models capable of generating high-fidelity waveforms conditioned on linguistic and prosodic features. Feature extraction components may preprocess audio data to create Mel-spectrograms or other representations used during model training using the pretraining components 104.

Specialty server devices within the generative AI system 100, such as those of the distributed server infrastructure 114, may include GPUs, TPUs, or custom AI accelerators designed for high-throughput operations supporting both transformer and diffusion model training. These servers may differ from ordinary servers by incorporating high-bandwidth memory (HBM), advanced interconnects (e.g., NVLink, PCIe Gen5), and thermal and power management systems optimized for large-scale generative model workloads.

The generative AI system 100 may store shard-specific checkpoints, intermediate latents, and optimizer states for large-scale diffusion models, LLMs, and multimodal models on high-speed local or network-attached storage within the specialty servers, enabling resumption of training and inference jobs after interruptions or updates.

The fine-tuning components 106 of the generative AI system 100 may adapt generative models to specific user tasks or domain tasks, such as personalized content generation, domain-specific summarization, image style transfer, or voice cloning. Fine-tuning may involve supervised fine-tuning on task-specific datasets and reinforcement learning with human feedback (RLHF) where applicable, with data and gradients distributed across server devices for scalable operation.

The interfacing layers 108 of the generative AI system 100 may handle user prompts for LLM-based text generation, text-to-image generation requests, and speech synthesis requests. The system may tokenize or encode user prompts, generate conditioning latents where applicable (e.g., CLIP embeddings for image generation), and distribute inference tasks across server clusters for each modality-specific generative model. The interfacing layers 108 may include computer scripts, subroutines, or integrated tools for processing prompts, implementing models, and/or performing API calls to supplement and/or augment generative functions of LLMs and other models of the generative AI system 100. In some embodiments, the interfacing layers 108 include databases for accessing stored content (e.g., a vector database of content vectors for comparing with prompt vectors or query vectors) for contextual augmentation of model operation (e.g., for retrieval-augmented generation and its analogs). In some embodiments, the interfacing layers 108 integrate functionality from third-party systems (e.g., external to the generative AI system 100 and/or the distributed server infrastructure 114) into the generative AI system 100 using APIs and/or particular communication protocols to interact with generative model data (e.g., to execute generated code).

As illustrated in FIG. 1, the generative AI system 100 generates generative output 110. The generative AI system 100 can generate the generative output 110 in the form of text responses, images, videos, audio clips, or other multimodal digital content. The generative AI system 100 can generate the generative output 110 using the interfacing layers 108 in conjunction with one or more trained (e.g., pre-trained and fine-tuned, using the described components) generative models, including LLMs and others described herein.

In some embodiments, the generative AI system 100 generates the generative output 110 over one or more conversational interactions or turns with client device(s) 112. Indeed, the generative AI system 100 can provide the generative output 110 for display on the client device(s) 112. In addition, the generative AI system 100 can receive additional input in the form of text-based queries or prompts, images, videos, audio clips, and/or other multimodal content as part of an ongoing conversation between the generative AI system 100 and the client device(s) 112 and/or as part of a new conversation or instantiation of the generative AI system 100.

For large generative models exceeding single-device memory, the generative AI system 100 may implement model parallelism, with different server devices processing partitions of the model during inference across the distributed server infrastructure 114, and may use activation checkpointing and memory recomputation strategies to handle resource constraints efficiently across distributed modalities.

Server devices within the generative AI system 100 may utilize high-bandwidth interconnects for low-latency tensor and latent exchange during multi-stage generation processes (e.g., latent generation followed by decoding in diffusion models). This enables the generative AI system 100 to support complex, multi-step generation tasks, such as generating text and subsequently generating images conditioned on the generated text, while maintaining low latency.

The distributed server infrastructure 114 of the generative AI system 100 may include compute clusters with racks of specialty servers interconnected with high-bandwidth networking technologies such as InfiniBand, RDMA-enabled Ethernet, or custom fabrics, and distributed storage using NVMe over Fabrics (NVMe-oF) for rapid access to large model weights, intermediate outputs, and context data during inference.

The distributed server infrastructure 114 can include safety filtering and content moderation layers that operate in parallel with inference pipelines across modalities, applying token-level filtering for LLM outputs, image or video classification for generated visual content, and audio analysis for speech outputs to ensure outputs comply with operational policies and applicable regulations.

The distributed server infrastructure 114 can include orchestration and resource management layers that dynamically allocate compute, memory, and network resources across modalities, scaling generative model training and inference in response to user demand and system load while monitoring resource health across components of the generative AI system 100.

Collectively, the architecture illustrated in FIG. 1 enables the generative AI system 100 to provide scalable, efficient, and safe generative model services across text, image, video, audio, and other modalities, leveraging specialty server devices and distributed computing for high-throughput training, fine-tuning, and inference across a wide variety of generative AI applications.

Figure 2:
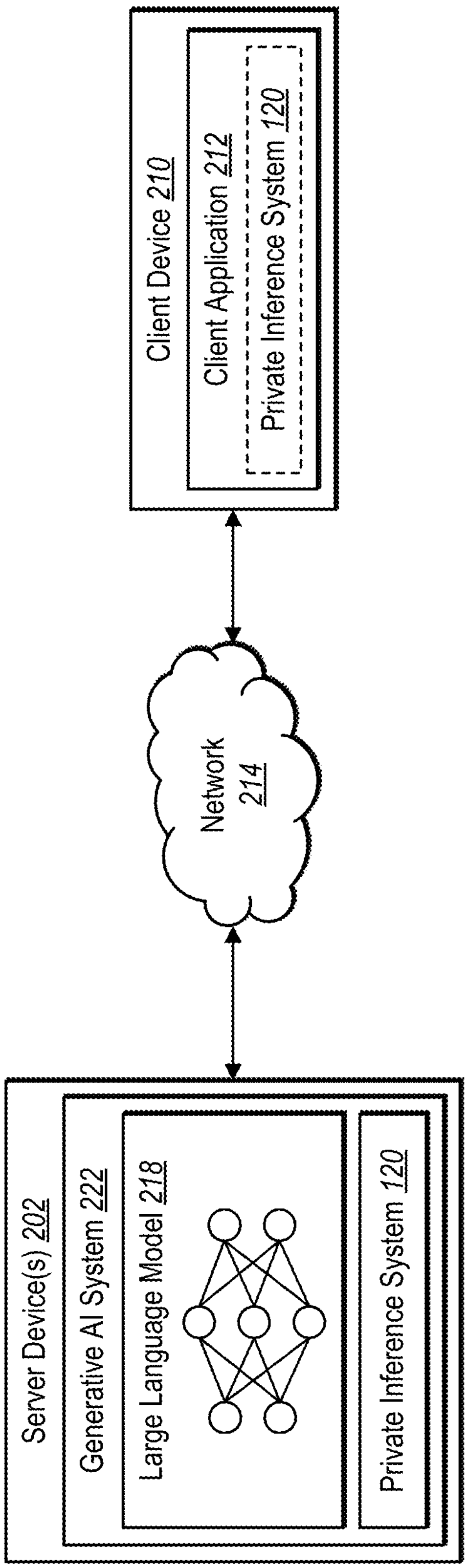
FIG. 2 illustrates a diagram of an environment in which a private inference system operates in accordance with one or more embodiments.

FIG. 2 illustrates a schematic diagram of an example system environment for implementing a private inference system 120 in accordance with one or more implementations. An overview of the private inference system 120 is described in relation to FIG. 2. As shown, the environment includes server device(s) 202, a client device 210, and a network 214. Each of the components of the environment can communicate via the network 214, and the network 214 may be any suitable network over which computing devices can communicate. Example networks are discussed in more detail below in relation to FIGS. 12-13.

As just mentioned, the example environment includes a client device 210. The client device 210 can be one of a variety of computing devices, including a smartphone, a tablet, a smart television, a desktop computer, a laptop computer, a virtual reality device, an augmented reality device, or another computing device as described below in relation to FIGS. 12-13. The client device 210 can communicate with the server device(s) 202 via the network 214. For example, the client device 210 can receive user input from a user interacting with the client device 210 (e.g., via a client application 212) to, for instance, interact with a generative AI system 222 located on the server device(s) 202. In addition, the private inference system 120 on the server device(s) 202 can receive information relating to various interactions with user interface elements based on the input received by the client device 210.

As shown, the client device 210 can include the client application 212. In particular, the client application 212 may be a web application, a native application installed on the client device 210 (e.g., a mobile application, a desktop application, etc.), or a cloud-based application where all or part of the functionality is performed by the server device(s) 202. Based on instructions from the client application 212, the client device 210 can present or display information, including a dialogue between a user and a large language model 218.

As illustrated in FIG. 2, the example environment includes the server device(s) 202. The server device(s) 202 may generate, track, store, process, receive, search, communicatively link, and transmit electronic data, such as digital content (e.g., content items), datasets, messages, searchable data, pages of data, prompts, responses, interface elements, searches, browsing activity, browsing data, encrypted message content, decrypted message content, interactions with interface elements, and/or interactions between user accounts or client devices and the generative AI system 222. For example, the server device(s) 202 may receive data from the client device 210 in the form of a user prompt or query. Additionally, the server device(s) 202 can process inputs through the large language model 218 and return generated outputs such as text, summaries, images, audio tracks, video tracks, or tokens. In some embodiments, the server device(s) 202 manage auxiliary tasks such as session tracking, context management, content filtering, and integration with databases or external tools. Indeed, the server device(s) 202 can communicate with the client device 210 to send and/or receive data via the network 214. In some implementations, the server device(s) 202 comprise a distributed server where the server device(s) 202 include a number of server devices distributed across the network 214 and located in different physical locations. The server device(s) 202 can comprise one or more content servers, application servers, communication servers, web-hosting servers, machine learning servers, and other types of servers.

As shown in FIG. 2, the server device(s) 202 can also include the private inference system 120 as part of the generative AI system 222. The generative AI system 222 (e.g., the generative AI system 100) can communicate with the client device 210 to perform various functions associated with the client application 212 such as receiving text prompts or queries and generating outputs using the large language model 218. The generative AI system 222 ingests structured or unstructured input data and uses the large language model 218 to intelligently produce outputs. The generative AI system 222 can further interface with backend infrastructure to manage contextual states, retrieve relevant documents, and update session-specific information. In some examples, the generative AI system 222 interacts with a cloud storage module to access user-linked content items or synchronize generated outputs with external third-party applications.

Although FIG. 2 depicts the private inference system 120 located on the server device(s) 202, in some implementations, the private inference system 120 may be implemented by (e.g., located entirely or in part on) one or more other components of the environment. For example, the private inference system 120 may be implemented by the client device 210 and/or a third-party device. For example, the client device 210 can download all or part of the private inference system 120 for implementation independent of, or together with, the server device(s) 202. In some embodiments, the private inference system 120 is implemented as a plug-in or modular extension associated with the large language model 218.

In some implementations, the environment may have a different arrangement of components and/or may have a different number or set of components altogether. For example, the client device 210 may communicate directly with the private inference system 120, bypassing the network 214. As another example, the environment can include a database located externally to the server device(s) 202 (e.g., in communication with the server device(s) 202 via the network 214), located on the server device(s) 202, on third-party servers, and/or on the client device 210.

As illustrated by the foregoing discussion, the present disclosure utilizes a variety of terms to describe features and advantages of the private inference system 120. Additional detail is now provided regarding the meaning of such terms. For example, as used herein, the term "generative model" refers to a machine learning model that is configured to generate new data samples that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms, and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

As used herein, the term "chat message" refers to information communicated as part of a conversation between a client device and a generative artificial intelligence system. A chat message may include a user-provided input (e.g., a user prompt), a system-generated output (e.g., a model response), or both, and may comprise text, images, audio, video, multimodal data, metadata, or any combination thereof. A chat message may exist in various representations or states, including encrypted, decrypted, partially processed, or transformed forms, depending on the stage of processing within the private inference system 120.

Relatedly, the term "encrypted chat message" refers to a chat message that has been cryptographically transformed using one or more encryption keys such that the content of the chat message is not accessible in plaintext form without possession of one or more corresponding decryption keys. An encrypted chat message may be transmitted, stored, or routed through components of a system that do not have access to the encryption/decryption keys.

Additionally, the term "decrypted chat message" refers to a chat message that has been transformed from an encrypted form into a plaintext or otherwise intelligible form using the corresponding decryption key. A decrypted chat message within the private inference system 120 may exist temporarily during authorized processing, such as inference, safety classification, or background processing, and may be confined to execution within a trusted execution environment or other protected execution context.

Moreover, the term "re-encrypted chat message" refers to a chat message that has been encrypted again after decryption, typically using a different encryption key or encryption context than was used to produce the encrypted chat message. The private inference system 120 may re-encrypt a chat message to enable transfer of the chat message between different processing stages, execution environments, or security boundaries while limiting access to plaintext content.

As used herein, the term "trusted execution environment" refers to a hardware-backed execution environment configured to provide isolation and protection for code and data during execution, such that software executing outside the trusted execution environment is restricted from accessing the code, data, or intermediate states of data within the trusted execution environment. A trusted execution environment may enforce confidentiality and integrity of data in use, may support cryptographic attestation of its execution state, and may limit access to memory, registers, or processing resources to authorized code. For example, a trusted execution environment can be implemented using secure hardware features, confidential computing technologies, or a combination thereof, and may include one or more secure enclaves or confidential execution contexts.

As used herein, the term "secure enclave" refers to a protected execution context operating within a trusted execution environment that is configured to execute a defined set of code with access to sensitive data while preventing access to such data by software executing outside the secure enclave. A secure enclave may be used to perform operations such as decryption, policy evaluation, re-encryption, key handling, or other preparatory processing, and may restrict access to plaintext data to the duration of authorized execution within the enclave.

As used herein, the term "confidential container" refers to an isolated execution environment configured to execute software workloads with hardware-enforced confidentiality protections, such that code and data associated with the workload are protected from access by software executing outside the confidential container. A confidential container may operate within a trusted execution environment and may be configured to execute a private engine instance, such as a generative artificial intelligence model, while restricting access to plaintext data, intermediate computation states, or execution memory of the containerized workload.

As used herein, the term "private engine instance" refers to an instance of software configured to execute one or more generative models within a protected execution environment, such as a confidential container operating within a trusted execution environment. A private engine instance is configured to receive protected inputs, perform inference or other model-based processing on plaintext or otherwise intelligible data confined to the protected execution environment, and generate outputs while restricting access to plaintext or otherwise intelligible data, intermediate computation states, or execution memory to authorized execution contexts.

Furthermore, as used herein, the term "session key" refers to a cryptographic key established for use during a limited communication session or processing interval, and configured to encrypt or decrypt data exchanged or processed during that session. A session key may be symmetric and may be generated, derived, or negotiated using one or more cryptographic protocols, may be scoped to a particular client device, conversation, or processing context, and may be discarded or invalidated upon termination of the communication session.

Relatedly, the term "shared session key" refers to a session key that is established between a client device and a server-side component of a generative artificial intelligence system, such that the client device and the server-side component are both able to use the shared session key to encrypt or decrypt data exchanged during a private communication session. A shared session key may be established (e.g., with a backend server hardened by removing privileged access and nearly all ingress and egress to nodes and pods, except carefully whitelisted systems) in response to verification of a hardware-backed attestation (e.g., with version changes recorded in transparency logs and subject to revocation if compromised) and may be used to protect chat messages communicated between the client device and a trusted execution environment of the generative artificial intelligence system.

Moreover, the term "client-controlled storage encryption key" refers to a cryptographic key associated with a client device and used to encrypt and decrypt stored chat history or related data, wherein the client device controls access to the key, and a server-side storage container does not have access to the key. A client-controlled storage encryption key may persist across multiple chat sessions, may be generated or stored using secure facilities of the client device, and may be used to encrypt chat messages, response content, or derived data for storage while preventing the server-side storage container from accessing or disclosing plaintext of the stored data.

As used herein, the term "encrypted chat history" refers to stored data associated with one or more chat messages, responses, or related derived data that has been encrypted such that the content is not accessible in plaintext form without possession of a corresponding decryption key. Encrypted chat history may be stored on a server-side storage container while remaining encrypted using a client-controlled storage encryption key, such that the server-side storage container does not have access to plaintext of the stored data. Encrypted chat history may include all or a portion of a conversation, may persist across multiple chat sessions, and may be decrypted only within authorized processing contexts, such as execution within a server-side trusted execution environment or on a client device possessing the client-controlled storage encryption key.

As used herein, the term "private status" refers to an indication associated with a chat message, conversation, or processing request that designates the message or conversation for private handling by a generative artificial intelligence system. A private status may be specified by a client device, inferred based on user input or system settings, or otherwise determined by the private inference system, and may lead the private inference system to apply privacy-preserving processing, such as execution within a trusted execution environment, restricted plaintext access, or client-controlled encryption.

Relatedly, the term "private chat" refers to a conversation between a client device and a generative artificial intelligence system in which one or more chat messages are associated with a private status and are processed in accordance with privacy-preserving constraints (e.g., such that no non-participant users can access the chat). In a private chat, server-side access to plaintext chat messages, responses, or derived data may be confined to authorized execution within a trusted execution environment, and chat history may be stored in encrypted form using a client-controlled storage encryption key.

Moreover, the term "private processing mode" refers to an operational mode of a generative artificial intelligence system in which processing of chat messages associated with a private status is performed under privacy-preserving conditions. In private processing mode, inference, safety classification, or background processing may be executed within a trusted execution environment or other protected execution context, and access to plaintext data may be restricted to such contexts. A private processing mode may be entered, maintained, or exited based on system eligibility checks, user input, or policy conditions.

Relatedly, the term "non-private processing mode" refers to an operational mode of a generative artificial intelligence system in which processing of chat messages is performed outside the privacy-preserving constraints associated with a private processing mode. In a non-private processing mode, inference or related processing may be executed outside a trusted execution environment, and plaintext access to chat messages or responses may occur outside protected execution contexts. A non-private processing mode may be entered based on system eligibility checks, user input, policy conditions, or transition from a private processing mode, and may coexist with private processing mode for different portions of a conversation.

Figure 3:
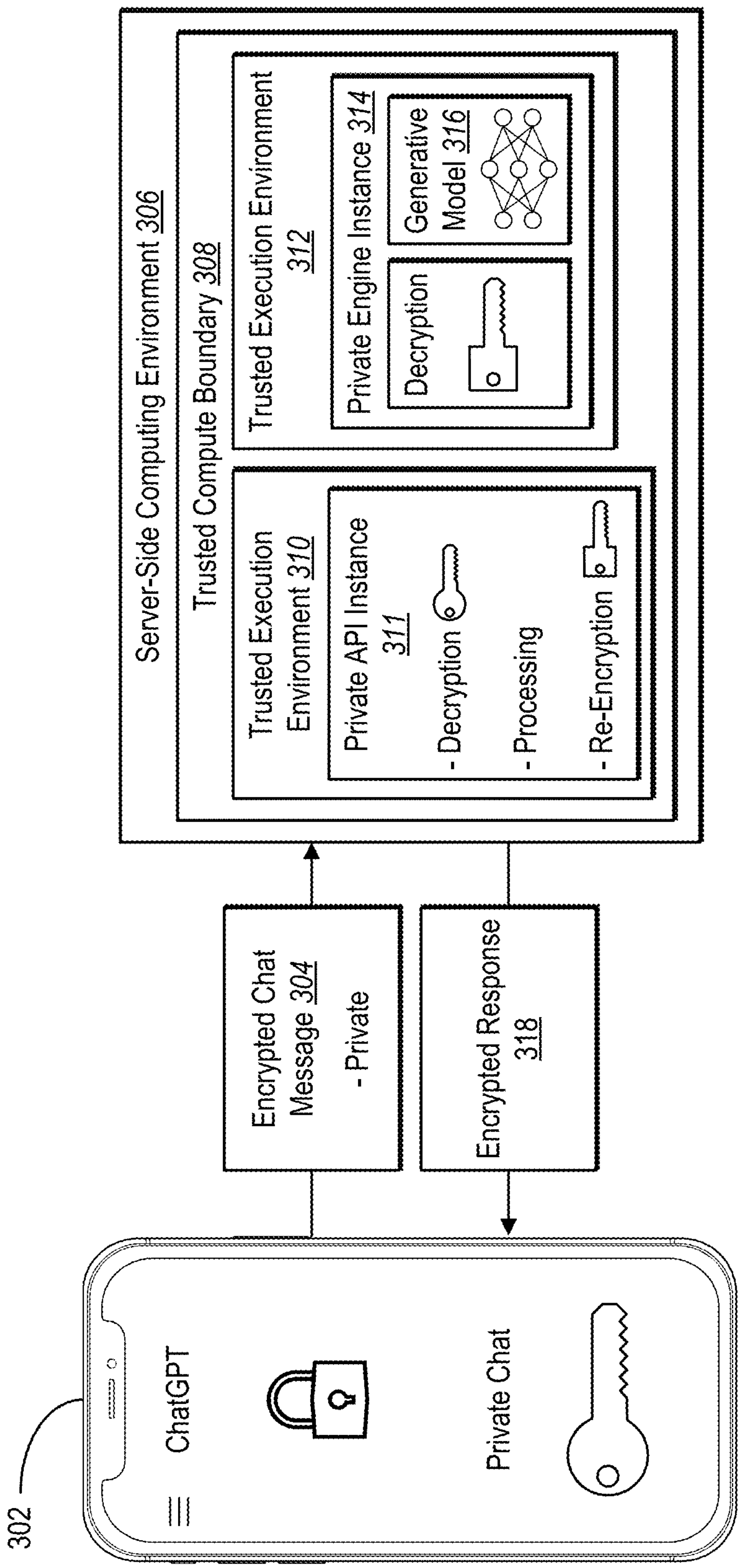
FIG. 3 illustrates the private inference system accessing an encrypted chat message, using a generative model to perform inference on plaintext from the encrypted chat message in a trusted execution environment, and providing an encrypted response in accordance with one or more embodiments.

As mentioned, in various embodiments, the private inference system 120 performs private inference on user queries in a private chat mode. For instance, FIG. 3 illustrates the private inference system 120 accessing an encrypted chat message, using a generative model to perform inference on plaintext from the encrypted chat message in a trusted execution environment, and providing an encrypted response in accordance with one or more embodiments. Additional detail regarding the acts and processes introduced in relation to FIG. 3 is provided thereafter with reference to subsequent figures.

Specifically, FIG. 3 shows a client device 302 (e.g., the client device 210) using a private chat mode to send an encrypted chat message 304 marked with a private status to a server-side computing environment 306 (e.g., the server device(s) 202 executing the generative AI system 222). The server-side computing environment 306 can include a trusted compute boundary 308 that isolates certain computing operations from external access, as described in detail herein.

For example, the trusted compute boundary 308 can include a trusted execution environment 310 within which the private inference system 120 can decrypt the encrypted chat message 304 to generate a decrypted chat message. For example, the private inference system 120 uses a shared session key established between the client device 302 and the trusted compute boundary 308 to decrypt the encrypted chat message 304. For instance, and as described in additional detail below in connection with FIG. 6, the private inference system 120 establishes the shared session key at the client device 302 based on a hardware-backed attestation indicating server-side processing within the trusted compute boundary 308.

To elaborate, in one or more embodiments, the private inference system 120 utilizes a private API instance 311 within the trusted execution environment 310 to perform decryption, processing, and re-encryption for the encrypted chat message 304. For example, the private inference system 120 runs the private API instance 311 within a secure enclave of the trusted execution environment 310.

Additionally, in one or more embodiments, the private inference system 120 processes the decrypted chat message to determine further processing actions for the chat message. For example, the private inference system 120 can evaluate whether the chat message is eligible for private inference processing within the trusted compute boundary 308, determine a type of generative model or computing resource suitable for the chat message, select a particular private engine instance or hardware accelerator for inference, and/or apply policy checks associated with private chat processing. In various embodiments, the private inference system 120 performs such determinations within the trusted execution environment 310 to avoid exposing plaintext of the chat message outside the trusted execution environment 310.

In one or more embodiments, the private inference system 120 determines further processing actions by invoking one or more internal interfaces configured to route the chat message to an appropriate confidential execution context. For example, the private inference system 120 may invoke a restricted interface exposed within the trusted compute boundary 308 to forward the re-encrypted chat message to a selected private engine instance. Such interfaces can be configured to limit invocation to authorized components within the trusted compute boundary 308 and to prevent access to plaintext by orchestration layers or routing logic executed outside the trusted compute boundary 308.

Moreover, the private inference system 120 can re-encrypt the decrypted chat message before sending the chat message to a trusted execution environment 312 (e.g., another trusted execution environment logically isolated from the trusted execution environment 310) for inference. For example, the private inference system 120 uses the trusted execution environment 310 to generate a re-encrypted chat message by re-encrypting the decrypted chat message with an additional session key established for a private engine instance 314. The private inference system 120 can establish the additional session key within the trusted compute boundary 308 for secure communication between the private API instance 311 and the private engine instance 314.

In one or more embodiments, the separation between the trusted execution environment 310 and the trusted execution environment 312 helps enable staged confidential processing of private chat messages. In particular, the trusted execution environment 310 can be configured to perform initial handling of decrypted chat messages, including policy evaluation, routing decisions, and preparation of inputs for inference, while the trusted execution environment 312 is configured to execute the generative model. By re-encrypting the decrypted chat message before transferring the chat message to the trusted execution environment 312, the private inference system 120 helps to ensure that plaintext of the chat message is not accessible outside of an authorized execution context, even within the trusted compute boundary 308.

Furthermore, FIG. 3 shows the private inference system 120 using the private engine instance 314 operating within the trusted execution environment 312 to decrypt the re-encrypted chat message (e.g., using the additional session key). For example, the private inference system 120 runs the private engine instance 314 within a confidential container of the trusted execution environment 312. Additionally, the private inference system 120 can initiate a generative model 316 to generate a response corresponding to the encrypted chat message 304. For example, the private inference system

120 uses a large language model to generate a response to a user query encrypted within the encrypted chat message 304. Moreover, the private inference system 120 can encrypt the response to send an encrypted response 318 to the client device 302 as a turn (e.g., following the encrypted chat message 304 in turn) within a private conversation.

In one or more embodiments, the private inference system 120 implements the trusted execution environment 310 and the trusted execution environment 312 using different types of confidential computing resources. For example, the trusted execution environment 310 may execute on one or more central processing units (CPUs) configured to provide hardware-backed confidential execution for control-plane operations, such as decryption of chat messages, policy evaluation, routing decisions, and preparation of inputs for inference. By contrast, the trusted execution environment 312 may include a confidential execution environment that spans both CPU resources and one or more hardware accelerators, such as graphics processing units (GPUs), configured to execute computationally intensive portions of generative model inference.

In such embodiments, the private engine instance 314 may utilize CPU resources within the trusted execution environment 312 to manage request handling, tokenization, or coordination of model execution, while delegating execution of neural network forward passes, sampling, or other high-throughput computations to GPU resources operating under confidential computing protections. The confidential container executing the private engine instance 314 may restrict access to GPU memory, intermediate activations, and generated outputs such that plaintext data processed by the GPU remains inaccessible to host software executing outside the trusted execution environment 312.

By separating initial message handling and policy evaluation from model execution across trusted execution environment 310 and trusted execution environment 312, the private inference system 120 supports staged confidential processing while accommodating heterogeneous hardware architectures. Re-encrypting the chat message between the trusted execution environments enables secure transfer of inputs across execution contexts that may rely on different confidential computing mechanisms, while maintaining confinement of plaintext access to authorized execution boundaries.

In one or more embodiments, the private inference system 120 is implemented using multiple cooperating components that collectively provide private inference functionality. While certain figures illustrate specific arrangements of trusted execution environments, secure enclaves, confidential containers, and processing stages, the described functionality is not limited to any particular number of execution environments or processing boundaries. For example, in one or more embodiments, decryption, policy evaluation, re-encryption, and inference may be performed within a single trusted execution environment or distributed across multiple trusted execution environments or confidential execution domains, while confining access of plaintext chat message content to authorized execution contexts.

The private inference system 120 provides a variety of technical improvements relative to existing systems. For example, the private inference system 120 introduces technical mechanisms that enhance privacy of generative AI systems. For instance, the private inference system 120 provides a novel inferencing pipeline that constrains how conversational content is processed and stored within a distributed computing environment. In particular, the private inference system 120 limits plaintext handling of chat messages and responses to protected execution contexts, while enabling encrypted communication and storage across other system components. By separating encryption contexts for communication, execution, and storage, and by confining sensitive operations to trusted execution environments, the private inference system 120 reduces the number of system components that are able to access private content in plaintext form. In particular, the use of a trusted execution environment enables plaintext processing of chat messages and responses to occur within a hardware-backed execution boundary that provides isolation from other software executing on the same computing infrastructure. As a result, components such as operating systems, virtualization layers, orchestration logic, and storage services may handle encrypted data or execution control without obtaining access to plaintext content. These mechanisms of the private inference system 120 enable conversational functionality, persistence of chat history, and background processing while maintaining technical controls over where and when sensitive data is accessible during execution.

To elaborate, by confining sensitive operations to trusted execution environments, the private inference system 120 limits the lifetime and scope of plaintext exposure during processing. Plaintext representations of chat messages, responses, or derived data may be present only transiently within protected memory during authorized operations such as inference, safety classification, or background processing, and the private inference system 120 may delete or re-encrypt the plaintext representations upon completion of such operations. By leveraging hardware-enforced isolation and controlled execution boundaries, the private inference system 120 enables generative model execution on sensitive conversational data while maintaining technical privacy constraints on where plaintext data exists and which system components are capable of accessing the plaintext data.

Additionally, the private inference system 120 introduces technical mechanisms that integrate safety analysis with generative model execution in a controlled manner. Safety classification operations are performed on plaintext content within protected execution contexts, allowing safety determinations to be made without exposing conversational data to external components. The private inference system 120 further supports conditional handling of content based on safety outcomes, including selective disclosure or alternative processing paths, while preserving privacy guarantees for content not subject to such handling. By coordinating safety analysis with inference and execution boundaries, the private inference system 120 improves consistency of safety enforcement across different stages of processing while limiting unnecessary propagation of sensitive data.

To elaborate, in some embodiments, the private inference system 120 uses one or more large language models within a trusted execution environment to perform private inference for private chat messages. For instance, FIG. 4 illustrates the private inference system 120 executing a large language model to generate a response for a chat message within a trusted execution environment in accordance with one or more embodiments.

Figure 4:
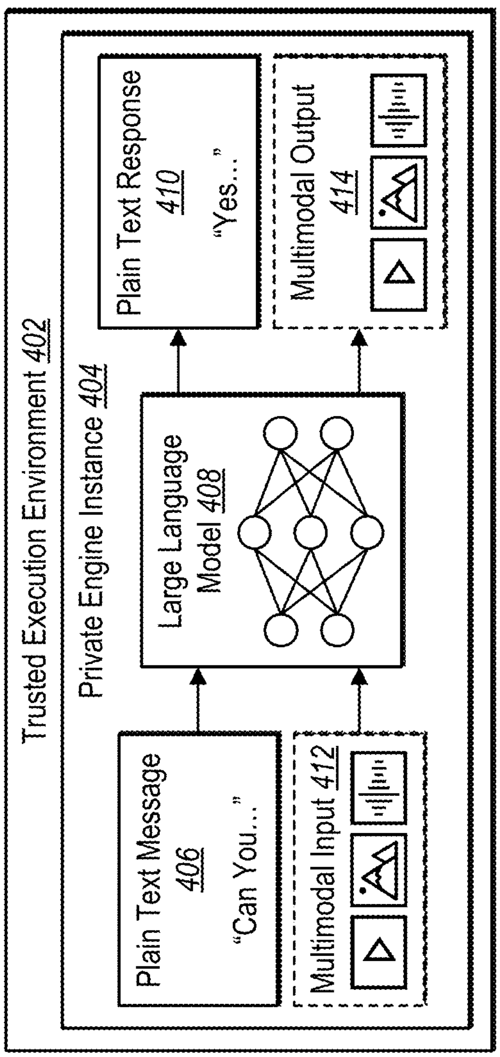
FIG. 4 illustrates the private inference system executing a large language model to generate a response for a chat message within a trusted execution environment in accordance with one or more embodiments.

Specifically, FIG. 4 shows the private inference system 120 operating a trusted execution environment 402. Within the trusted execution environment 402, the private inference system 120 can utilize a private engine instance 404 to process a plaintext message 406 (e.g., a chat message version decrypted from an encrypted chat message) through a large language model 408 to generate a plaintext response 410. For instance, the private inference system 120 executes the large language model 408 within the trusted execution environment 402 to generate the plaintext response 410 based on plaintext tokens derived from decrypting a re-encrypted chat message. Moreover, the plaintext message 406 and the plaintext response 410 are inaccessible to the generative AI system outside of the trusted execution environment 402. For example, the private inference system 120 encrypts the plaintext response 410 before sending the response outside of the trusted execution environment 402.

In one or more embodiments, the private engine instance 404 operates within an isolated runtime environment configured to restrict access to memory, registers, and intermediate computation results associated with the large language model 408. For example, the confidential container executing the private engine instance 404 can prevent access to plaintext tokens, model activations, or generated outputs by other software components executing outside the trusted execution environment 402. In addition, the plaintext message 406 and the plaintext response 410 may exist only transiently during execution of the large language model 408, as the private inference system 120 may delete or overwrite the plaintext message 406 and the plaintext response 410 upon completion of the inference operation.

More particularly, in one or more embodiments, temporary plaintext access within the trusted execution environment 402 is an expected and controlled aspect of private inference. For example, plaintext tokens, intermediate representations, or plaintext generated outputs may be present in memory during execution of the generative model or safety classification operations. Such plaintext access is confined to the trusted execution environment 402 and is limited in duration to the performance of authorized operations, after which the private inference system 120 removes plaintext data from memory.

Furthermore, as shown in FIG. 4, the private inference system 120 can operate on multimodal data. For example, in one or more embodiments, the private inference system 120 can process a multimodal input 412 through the large language model 408 to generate a multimodal output 414. To elaborate, in one or more embodiments, the private inference system 120 receives an encrypted chat message that includes encrypted multimodal input, such as image data, audio data, or video data. In certain embodiments, the multimodal input includes a text query asking for an output in image, audio, and/or video format. Moreover, the private inference system 120 can use the private engine instance 404 to execute the large language model 408 (or another generative model) to generate the multimodal output 414 from the multimodal input 412. In one or more embodiments, the private inference system 120 processes the multimodal input 412 in a manner similar to text inputs (e.g., with respect to encryption, decryption, and/or confinement within the trusted execution environment 402).

In one or more embodiments, the generative model executed by the private engine instance 404 includes one or more of a large language model, a multimodal transformer, a vision-language model, an audio processing model, or a combination thereof. In some embodiments, different private engine instances are configured to execute different types of generative models or to leverage different hardware accelerators, such as central processing units (CPUs), graphics processing units (GPUs), or specialized inference accelerators, while maintaining confidentiality guarantees associated with execution within the trusted execution environment 402.

Moreover, in some embodiments, the private inference system 120 stores private history of private chat messages. For instance, FIG. 5 illustrates the private inference system 120 using a trusted execution environment to encrypt chat history of a private conversation for storage in accordance with one or more embodiments.

Figure 5:
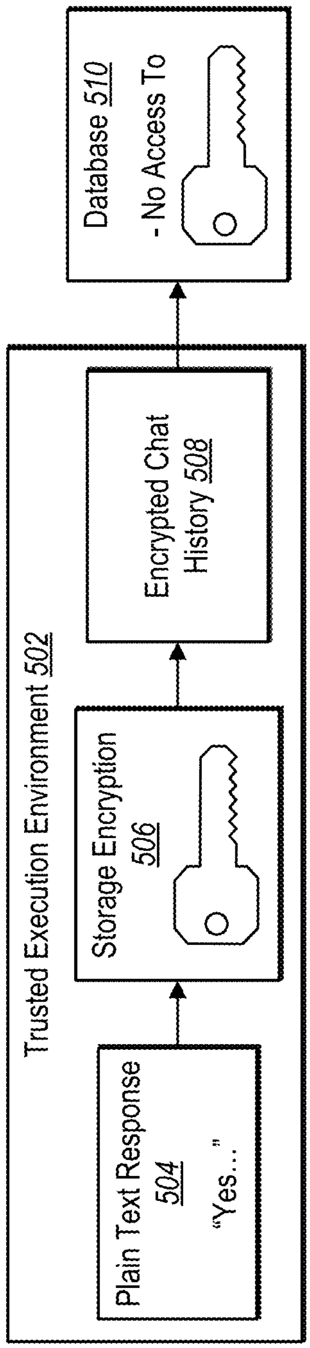
FIG. 5 illustrates the private inference system using a trusted execution environment to encrypt chat history of a private conversation for storage in accordance with one or more embodiments.

Specifically, FIG. 5 shows the private inference system 120 operating a trusted execution environment 502. In the trusted execution environment 502, the private inference system 120 can perform an act 506 of storage encryption on a plaintext response 504 (as well as a corresponding plaintext message) to generate encrypted chat history 508. For example, the private inference system 120 encrypts at least a portion of the plaintext response 504 for storage as part of the encrypted chat history 508. For instance, the private inference system 120 uses a client-controlled storage encryption key to encrypt the plaintext response 504.

In one or more embodiments, the private inference system 120 encrypts chat history by encrypting response content, user prompts, and derived data, while allowing certain non-sensitive metadata to be stored or processed separately. For example, in certain embodiments, the private inference system 120 may store timestamps, message identifiers, or routing metadata without encryption or by using a different protection mechanism, while maintaining encryption for chat message content and derived data using the client-controlled storage encryption key.

In one or more embodiments, the client-controlled storage encryption key is different from the shared session key established between the client device and the server-side computing environment. Additionally, in one or more embodiments, the client-controlled storage encryption key is different from the additional session key established within the trusted execution environment for processing private chat messages. Indeed, while the first shared session key and the second session key typically exist only temporarily (e.g., for the duration of a private chat), the private inference system 120 can establish the client-controlled storage encryption key as a long-term key with which the client device can access chat history at a future time.

In one or more embodiments, the private inference system 120 generates, stores, or manages the client-controlled storage encryption key using secure facilities available on the client device. For example, the private inference system 120 may use the client device to store the client-controlled storage encryption key within a secure element, trusted platform module, operating-system-provided key store, or browser-based secure storage. In some embodiments, the private inference system 120 derives the client-controlled storage encryption key from user credentials or device-specific secrets on the client device, while in other embodiments the private inference system 120 generates the key randomly and locally at the client device. Regardless of implementation, the private inference system 120 can keep the client-controlled storage encryption key inaccessible to storage server(s).

To elaborate, in one or more embodiments, by separating the client-controlled storage encryption key from session-specific keys, the private inference system 120 can support persistent encrypted chat history without retaining access to plaintext of chat messages across chat sessions. For example, the shared session key and the additional session key may be deleted or invalidated upon termination of a private chat session, while the client-controlled storage encryption key remains available to the client device for future retrieval and decryption of chat history. In this manner, the private inference system 120 can support long-term storage of encrypted chat history without maintaining server-side access to plaintext chat conversation data.

In one or more embodiments, the private inference system 120 manages lifecycles of encryption keys to reduce risk of long-term key compromise. For example, the shared session key and the additional session key may be rotated, refreshed, or regenerated periodically during a private chat session, or upon occurrence of predefined events, such as reconnection or detection of anomalous behavior. In contrast, the client-controlled storage encryption key may persist across sessions while remaining inaccessible to the storage server(s). In this manner, the private inference system 120 can balance usability and security by limiting exposure of session-specific keys while preserving long-term access to encrypted chat history by the client device.

Moreover, FIG. 5 shows the private inference system 120 exporting the encrypted chat history 508 for storage outside the trusted execution environment 502. For example, the private inference system 120 stores the encrypted chat history 508 on a database 510 without access to the client-controlled storage encryption key. While the database 510 does not have access to the client-controlled storage encryption key, the client device can use the client-controlled storage encryption key to retrieve and decrypt chat history, such as chat messages including user prompts and response content from the generative model. Thus, the private inference system 120 can help ensure that plaintext of chat message content is accessible to the generative AI system only during authorized processing within the trusted execution environment 502.

In one or more embodiments, the private inference system 120 synchronizes encrypted chat history across multiple client devices associated with a user account. For example, using the database 510, the private inference system 120 may store and synchronize encrypted chat history across devices, while decryption of the chat history occurs only on authorized devices (e.g., within the trusted execution environment 502 or on client devices that possess the client-controlled storage encryption key). In this manner, users may access private chat history from multiple devices without exposing plaintext chat content to unauthorized computing environments.

As mentioned, in some embodiments, the private inference system 120 uses attestation to help a client device verify that the server-side computing environment is running a trusted version of code for private messaging and private inference. For instance, FIG. 6 illustrates the private inference system 120 using a trusted execution environment to provide a cryptographic attestation to a client device for a private chat session between the client device and a generative model in accordance with one or more embodiments.

Figure 6:
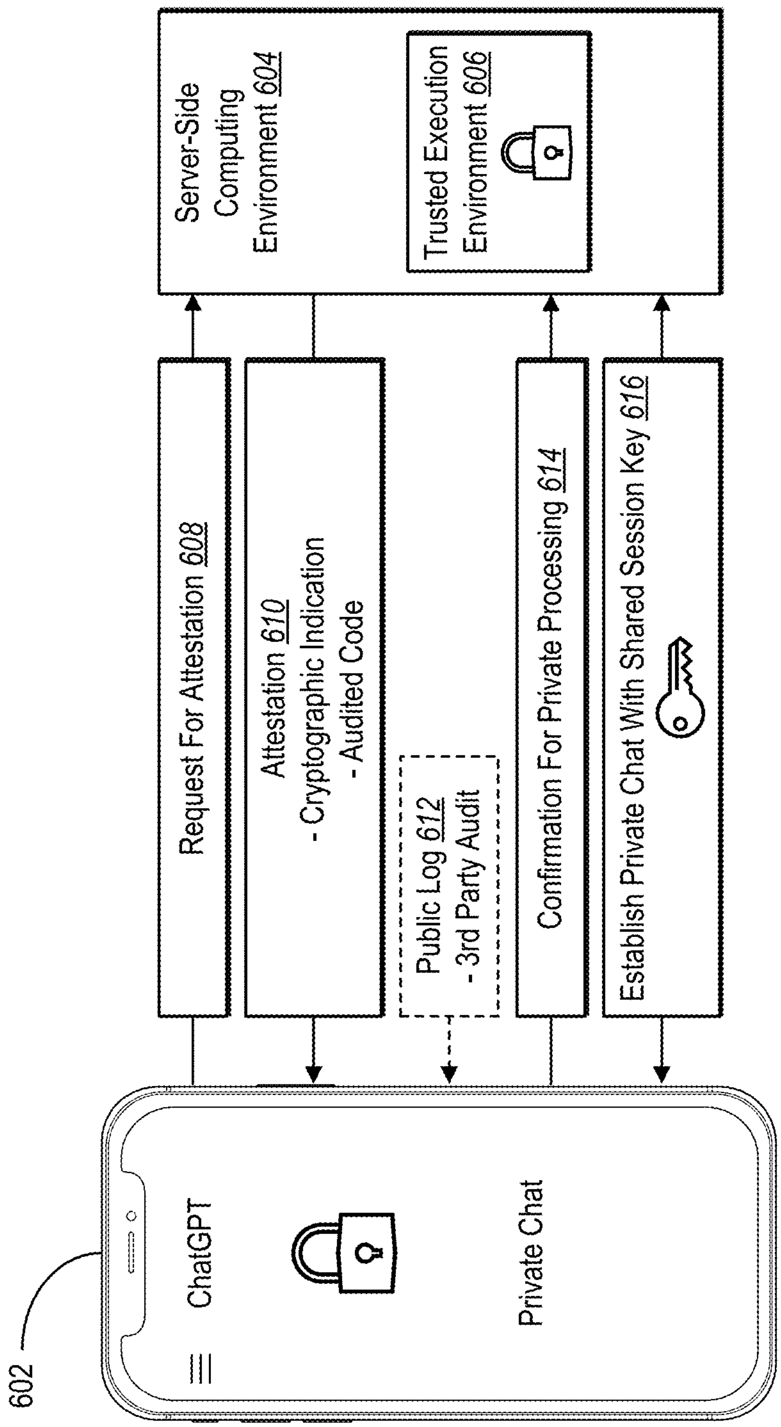
FIG. 6 illustrates the private inference system using a trusted execution environment to provide a cryptographic attestation to a client device for a private chat session between the client device and a generative model in accordance with one or more embodiments.

Specifically, FIG. 6 shows the private inference system 120 facilitating various communication tasks between a client device 602 (e.g., the client device 302) and a server-side computing environment 604 (e.g., the server-side computing environment 306) to help the client device 602 verify that the server-side computing environment 604 is running a trusted execution environment 606. As shown, the private inference system 120 can use the trusted execution environment 606 to provide a hardware-backed attestation 610 to the client device 602. To illustrate, in one or more embodiments, the hardware-backed attestation 610 is a cryptographic attestation indicating that the trusted execution environment 606 is executing an audited version of server-side code.

To elaborate, in one or more embodiments, the client device 602 sends a request 608 to the server-side computing environment 604, requesting an attestation of the code executable for servicing the private chat mode. In response to the request 608, the private inference system 120 can prompt the trusted execution environment 606 to provide the hardware-backed attestation 610 to the client device 602. In one or more embodiments, the audited version of server-side code referenced by the hardware-backed attestation 610 corresponds to code that has been reviewed, validated, or otherwise approved for private chat processing. For example, the attestation 610 may indicate a particular code measurement, configuration state, or execution environment associated with the trusted execution environment 606. The client device 602 can use this information to determine whether to establish a private chat session and to control whether encrypted chat messages are transmitted for decryption and processing within the trusted execution environment 606. In one or more embodiments, different trusted execution environments or confidential execution resources may provide respective attestations using different hardware-backed mechanisms appropriate to the underlying processing hardware (e.g., from corresponding CPU/GPU resources, etc.).

Additionally, as shown in FIG. 6, in one or more embodiments, the client device 602 accesses a public log 612 as part of verifying the hardware-backed attestation 610 provided by the trusted execution environment 606. The public log 612 may store information associated with audited versions of code, measurements, or execution configurations corresponding to trusted execution environments. In some embodiments, the client device 602 compares information included in the hardware-backed attestation 610 against entries in the public log 612 to determine whether the trusted execution environment 606 is executing an audited version of server-side code. In one or more embodiments, the public log 612 is independent of the server-side computing environment 604 and may be maintained by a third party or distributed system. Moreover, in one or more embodiments, the client device 602 accesses the public log 612 selectively, such as during initial establishment of a private chat session or upon changes in execution state. Thus, accessing the public log 612 is not required for every attestation exchange. The client device 602 may store entries from the public log 612 for subsequent verifications of cryptographic attestations from the trusted execution environment 606.

Moreover, in one or more embodiments, the client device 602 returns a verification or indication that the client device 602 is satisfied with the attestation 610. For example, the private inference system 120 receives a confirmation 614 from the client device 602 that the hardware-backed attestation 610 is satisfactory for establishing a private chat between the client device 602 and the generative AI system. For instance, the client device 602 provides verification that the attestation satisfies a trust criterion for private chat processing. For example, the client device 602 sends the confirmation 614 upon determining a match between the cryptographic indication in the attestation 610 and a corresponding entry in the public log 612. In response to receiving the confirmation 614, the private inference system 120 can establish a shared session key 616 between the client device 602 and the server-side computing environment 604 to proceed with a private chat session.

In one or more embodiments, if the client device 602 determines that the hardware-backed attestation 610 does not satisfy the trust criterion for private chat processing, the client device may refrain from establishing the shared session key and may instead continue the conversation in a non-private mode or terminate the chat session. In some embodiments, changes to the audited version of server-side code may cause previously valid attestations to become invalid, thereby requiring re-attestation before resuming private chat processing.

In one or more embodiments, the private inference system 120 provides hardware-backed attestations at multiple points during a private chat session. For example, the trusted execution environment 606 may provide an initial attestation prior to establishment of the shared session key and may provide subsequent attestations periodically or in response to changes in execution state, configuration, or deployed code. In some embodiments, the client device requires successful re-attestation before continuing to transmit encrypted chat messages for private processing.

Furthermore, in some embodiments, the private inference system 120 uses a safety classifier within the trusted execution environment to flag certain chat messages and to provide cryptographically provable assurances of non-access in non-flagged cases. For instance, FIG. 7 illustrates the private inference system 120 flagging a chat message based on predefined safety criteria in accordance with one or more embodiments.

Figure 7:
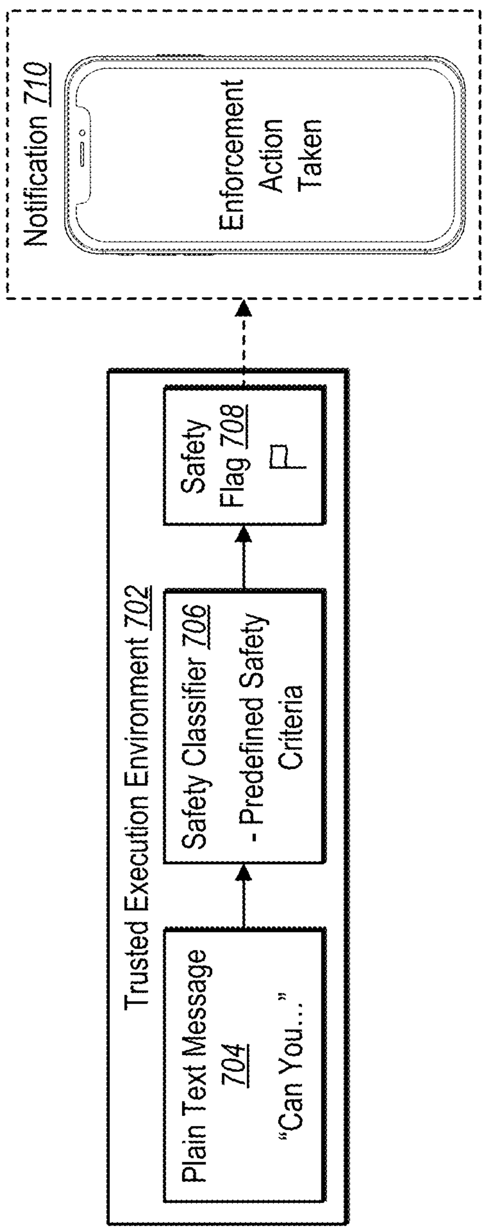
FIG. 7 illustrates the private inference system flagging a chat message based on predefined safety criteria in accordance with one or more embodiments.

Specifically, FIG. 7 shows the private inference system 120 operating a trusted execution environment 702. Within the trusted execution environment 702, the private inference system 120 can execute a safety classification operation to determine a safety classification for plaintext of a chat message or response (e.g., a decrypted chat message decrypted from an encrypted chat message). For instance, in one or more embodiments, the private inference system 120 uses an automated safety classifier to monitor chat messages for compliance with established safety criteria. For example, within the trusted execution environment 702, the private inference system 120 can process a plaintext message 704 through a safety classifier 706. The safety classifier 706 evaluates the plaintext message 704 against one or more predefined safety criteria (e.g., a safety taxonomy defining or describing violative content) to determine whether the plaintext message 704 violates a safety policy (e.g., related to violence or potentially harmful actions, etc.).

In one or more embodiments, the private inference system 120 performs the safety classification operation using a dedicated safety model or a safety head associated with the generative model. In some embodiments, the safety classifier operates on intermediate representations, tokens, or generated responses in addition to or instead of user-provided chat messages. Regardless of implementation, execution of the safety classification operation is confined to the trusted execution environment 702 to prevent exposure of plaintext content outside of authorized processing boundaries.

In one or more embodiments, the private inference system 120 performs safety classification at multiple points during processing of a chat message. For example, the private inference system 120 may apply safety classification prior to generating a response, during token-by-token generation of the response, and/or after generation of the response. In certain embodiments, different safety criteria are evaluated at different stages of processing, while maintaining confinement of plaintext content within the trusted execution environment 702.

In response to determining that a chat message violates a safety policy or otherwise triggers the predefined safety criteria, the private inference system 120 can issue a safety flag 708. In some embodiments, the safety flag 708 can indicate that the private inference system 120 should halt operations on the chat message and/or alert an external safety system. Additionally, in one or more embodiments, the private inference system 120 notifies the client device that an enforcement action has been taken. For example, the private inference system 120 provides a notification 710 for display via a graphical user interface of the client device. The notification 710 can indicate that an enforcement action has been taken. For example, in one or more embodiments, the notification 710 indicates that the chat message has raised a safety flag. In some embodiments, the notification 710 indicates that the chat session has been terminated. Alternatively, or additionally, in some embodiments, the notification 710 indicates that the user account is under review.

As mentioned, in some embodiments, the private inference system 120 terminates the chat session between the client device and the generative AI system based on the safety flag 708. In one or more embodiments, the private inference system 120 applies alternative actions in response to a safety flag, rather than terminating the chat session. For example, the private inference system 120 may modify or filter generated responses, restrict certain types of follow-up prompts, or require additional user confirmation before continuing the conversation. Such actions may be performed while maintaining confinement of plaintext content within the trusted execution environment 702.

Moreover, in various embodiments, the private inference system 120 applies one or more account-level actions to limit a user account associated with the client device in response to issuing the safety flag 708. For example, in one or more embodiments, the private inference system 120 may temporarily or permanently restrict access to private chat functionality, may suspend the account, or may impose rate limits on subsequent requests from the account. Such actions may be applied in accordance with system policies and may be performed without exposing plaintext content outside protected execution contexts (e.g., the plaintext message 704 remains within the trusted execution environment 702). In one or more embodiments, the private inference system 120 determines a running tally of safety flags for an individual user account, and implements account-level actions based on the running tally exceeding a threshold limit of safety flags.

In some embodiments, the private inference system 120 generates synthetic data based on aggregated private chat histories. For instance, FIG. 8 illustrates the private inference system 120 aggregating chat messages and using a large language model to generate a synthetic message based on the chat messages in accordance with one or more embodiments.

Figure 8:
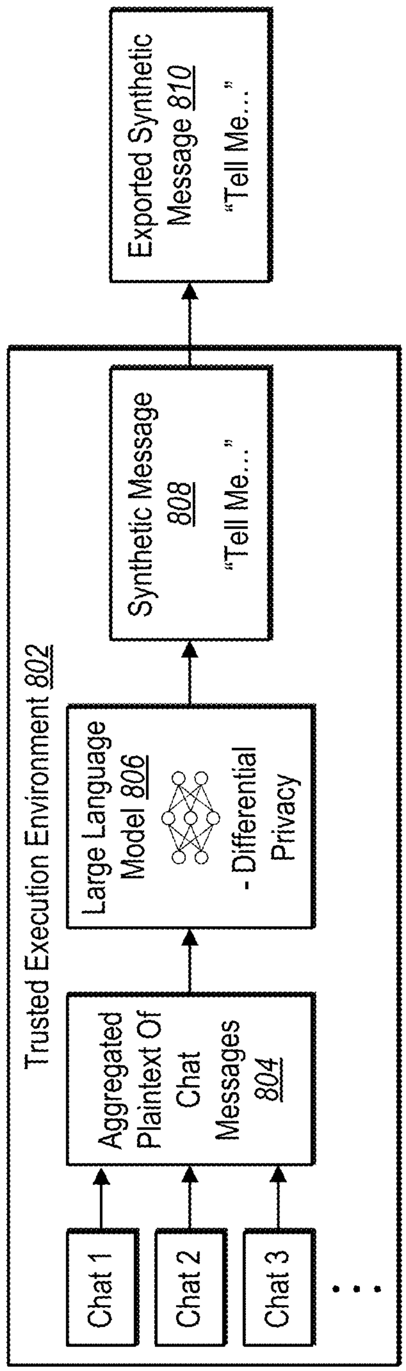
FIG. 8 illustrates the private inference system aggregating chat messages and using a large language model to generate a synthetic message based on the chat messages in accordance with one or more embodiments.

Specifically, FIG. 8 shows the private inference system 120 operating a trusted execution environment 802. Within the trusted execution environment 802, the private inference system 120 can aggregate chat messages for message synthesis. For example, the private inference system 120 aggregates the plaintext of a plurality of chat messages that satisfy a predefined similarity threshold. The private inference system 120 can generate an aggregated set 804 of plaintext from the plurality of chat messages.

In one or more embodiments, the private inference system 120 aggregates the chat messages across multiple private chat sessions and/or multiple users, provided that the chat messages satisfy similarity criteria. In some embodiments, the private inference system 120 aggregates the chat messages incrementally over time. In some embodiments the private inference system 120 aggregates the chat messages in one or more batches. The private inference system 120 can adjust aggregation parameters, such as similarity thresholds or minimum group sizes, to balance the utility of the synthetic data with privacy guarantees.

Moreover, the private inference system 120 can process the aggregated set 804 of plaintext of chat messages through a large language model 806 (or another type of generative model) to generate a synthetic message 808. For instance, the private inference system 120 uses the large language model 806 within the trusted execution environment 802 to generate a synthetic message that resembles the plurality of chat messages. For example, the private inference system 120 uses the large language model 806 to generate the synthetic message 808 to satisfy the predefined similarity threshold with the input plurality of chat messages.

Furthermore, in one or more embodiments, the private inference system 120 applies a differential privacy mechanism to limit the contribution of individual chat messages from the plurality of chat messages to the generation of the synthetic message 808. Moreover, in one or more embodiments, the private inference system 120 applies the differential privacy mechanism during generation of the synthetic message, rather than as a separate post-processing step. For example, the private inference system 120 may constrain the contribution of individual chat messages to the generative process for the synthetic message 808, add noise during generation, or otherwise limit the influence of any single chat message on the synthetic output. In this manner, the private inference system 120 can reduce the likelihood that the synthetic message 808 reveals information attributable to individual private chat messages.

Additionally, in one or more embodiments, the private inference system 120 exports the synthetic message 808 to an external portion of the generative AI system outside of the trusted execution environment 802. For example, the private inference system 120 sends an exported synthetic message 810 to an external component of the generative AI system for use outside of the trusted execution environment 802. For instance, the private inference system 120 sends the exported synthetic message 810 to the external component of the generative AI system for evaluation, testing, analysis, or improvement of one or more generative models. In one or more embodiments, the exported synthetic message 810 is stored or processed separately from encrypted chat history and is not associated with individual user chat sessions.

In one or more embodiments, the synthetic message data is used as training data for one or more generative artificial intelligence models. For example, after export from the trusted execution environment 802, synthetic messages may be incorporated into a training dataset used to train, fine-tune, or otherwise update parameters of a generative model. Because the synthetic messages are generated based on aggregated chat messages and subject to differential privacy constraints that limit contribution of individual chat messages, in one or more embodiments, the synthetic messages do not reveal information attributable to any particular user or private chat session. In this manner, the private inference system 120 enables improvement of generative models using information derived from private chats, while preventing direct use of private chat messages or responses as training data.

In one or more embodiments, synthetic messages used for training are governed separately from private chat history. For example, the private inference system 120 may store synthetic messages in a dataset that is logically and/or physically separated from encrypted chat history. In some embodiments, access controls, retention policies, or audit mechanisms associated with synthetic training data differ from those applied to private chat history, further reducing risk of private user data being reconstructed or inferred from trained models.

In one or more embodiments, synthetic training data is subject to lifecycle controls that differ from those applied to private chat history. For example, the private inference system 120 may retain synthetic messages for a limited duration, may periodically refresh synthetic messages, or may remove synthetic messages after incorporation into model updates. Such lifecycle controls further reduce the likelihood that information derived from private chat history persists indefinitely within training datasets.

Additionally, in some embodiments, the private inference system 120 transitions a chat conversation from a private chat mode to a non-private chat mode. For instance, FIG. 9 illustrates the private inference system 120 determining that continued chats in a conversation will be processed in a non-private mode, receiving consent from the client device, and transitioning inference to a non-private mode in accordance with one or more embodiments.

Figure 9:
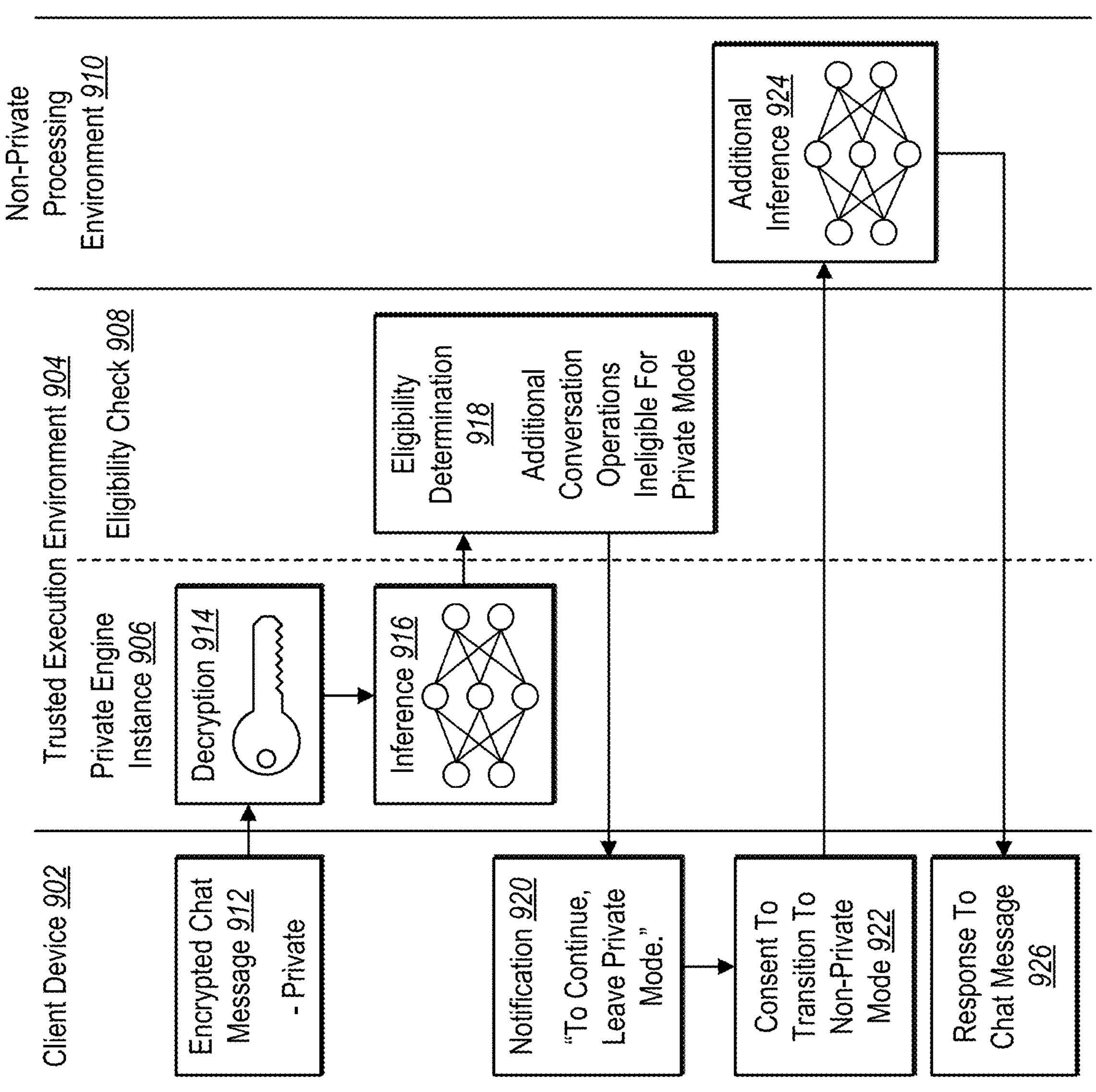
FIG. 9 illustrates the private inference system determining that continued chats in a conversation will be processed in a non-private mode, receiving consent from the client device, and transitioning inference to a non-private mode in accordance with one or more embodiments.

Specifically, FIG. 9 shows the private inference system 120 managing a private communication between a client device 902 and a trusted execution environment 904 executed in a server-side computing environment. Within the trusted execution environment 904, the private inference system 120 runs a private engine instance 906 and an eligibility check 908. The private inference system 120 uses the eligibility check 908 to ascertain whether inferencing operations are eligible for private-mode processing (e.g., whether the generative model(s) within the trusted execution environment 904 are suited for a particular inference operation, etc.). In addition, the private inference system 120 can manage a non-private processing environment 910 outside of the trusted execution environment 904.

FIG. 9 shows an example process flow for transitioning a private-mode chat to a non-private-mode chat according to one or more embodiments. To illustrate, the private inference system 120 accesses an encrypted chat message 912 marked with a private status by the client device 902. Additionally, within the trusted execution environment 904, the private inference system 120 can perform an act 914 of decrypting the encrypted chat message 912. Using the decrypted chat message, the private inference system 120 can perform one or more acts 916 of inference by processing plaintext of the chat message through a generative model (e.g., a large language model), as described herein in connection with preceding and subsequent figures. GPU processes do not expose memory to the host, and thus confidential container isolation prevents data leakage by the private engine instance 906.

Moreover, as shown in FIG. 9, the private inference system 120 can execute the eligibility check 908 to make an eligibility determination 918 of whether the conversation operations are eligible for private-inference mode. In certain cases, the eligibility check 908 determines that subsequent processing is not eligible for private inference processing based on one or more factors, such as a requested feature or tool not being supported within the trusted execution environment 904, a requested generative model not being available for confidential execution, resource constraints or availability of secure hardware, policy restrictions associated with a requested operation, or a determination that continued processing would require access to external systems outside the trusted execution environment 904.

To elaborate, in one or more embodiments, the private inference system 120 determines that subsequent processing of the conversation is not eligible for execution within the trusted execution environment 904. In response to the eligibility determination 918 that additional conversation operations are ineligible for private processing mode, the private inference system 120 can provide a notification 920 for display via a graphical user interface of the client device 902. For example, the notification 920 can indicate that the subsequent processing will continue outside of the trusted execution environment 904.

Furthermore, in one or more embodiments, the private inference system 120 can require consent from the client device 902 before transitioning the conversation to a non-private processing mode. For example, the notification 920 can include a selectable option to grant permission to the private inference system 120 to continue the chat conversation in a non-private processing mode. As illustrated, the client device 902 can provide consent 922 to transition to the non-private mode. Based on receiving an input from the client device 902 indicating consent to transition to the non-private processing mode (e.g., the consent 922), the private inference system 120 can process subsequent chat messages or operations of the conversation outside of the trusted execution environment 904. For example, the private inference system 120 performs one or more acts 924 of additional inference in the non-private processing environment 910.

Moreover, in one or more embodiments, transitioning a conversation from a private processing mode to a non-private processing mode does not retroactively affect privacy guarantees associated with prior chat messages. For example, chat messages and responses processed in the private mode may remain encrypted and inaccessible outside the trusted execution environment 904, while only subsequent chat messages are processed in the non-private processing environment 910. In some embodiments, the private inference system 120 logically segments a conversation to preserve a boundary between private and non-private portions of the conversation.

In one or more embodiments, the private inference system 120 supports graceful degradation when private processing becomes partially unavailable. For example, if a particular generative model or hardware accelerator becomes unavailable for execution within the trusted execution environment 904, the private inference system 120 may notify the client device 902 and allow the user to continue the conversation in a non-private processing mode for affected operations, while preserving privacy guarantees for prior private chat messages. In this manner, the private inference system 120 can maintain chat availability without weakening privacy protections.

In one or more embodiments, when a conversation transitions from private processing mode to non-private processing mode, the private inference system 120 restricts the use of prior private chat history during subsequent non-private inference. For example, in some embodiments, private chat messages processed within the trusted execution environment 904 may not be used as context for non-private inference unless explicitly permitted by the client device 902. In some embodiments, only derived data or summaries generated during private processing are eligible for use as context outside the trusted execution environment 904.

As shown in FIG. 9, the private inference system 120 can send the results of the additional inference to the client device 902 as a response 926 to the chat message. More particularly, in one or more embodiments, the private inference system 120 sends the additional inference results to the client device 902 without routing them through the trusted execution environment 904. For example, the additional inference is performed outside the trusted execution environment 904 after the conversation has transitioned to the non-private processing mode, and the resulting response is transmitted to the client device using a standard serving path.

Because plaintext of the additional inference is generated outside the trusted execution environment 904, routing the response through the trusted execution environment 904 would not restore the confidentiality guarantees associated with private processing and would therefore be unnecessary. Prior chat messages processed within the private processing mode remain subject to the privacy guarantees of the trusted execution environment and are not exposed as a result of transmitting the non-private response.

In one or more embodiments, the client device 902 maintains an indication of whether a conversation is operating in a private processing mode or a non-private processing mode, and updates the indication upon transition between modes so that the user can distinguish responses generated under different processing guarantees. To elaborate, in one or more embodiments, when the private inference system 120 transitions a chat from a private mode to a non-private mode, the private inference system 120 causes the client device 902 to provide an indication that subsequent responses are generated using non-private processing, while previously generated private responses remain associated with private processing guarantees.

In one or more alternative embodiments, transition from private processing mode to non-private processing mode is applied at an account level rather than at a conversation level. For example, the private inference system 120 may determine that an account associated with the client device 902 is no longer eligible for private chat processing based on one or more policy conditions, system determinations, or safety-related outcomes. In such embodiments, the account may be placed into a temporary or permanent status in which private chat functionality is disabled for subsequent conversations or requests, while non-private processing remains available. The private inference system 120 may later restore private chat functionality for the account based on expiration of a time period, satisfaction of predefined conditions, or administrative action.

In addition, in some embodiments, the private inference system 120 generates derived data from chat history separately from a chat session. For instance, FIG. 10 illustrates the private inference system 120 performing a background process to generate derived data in accordance with one or more embodiments.

Figure 10:
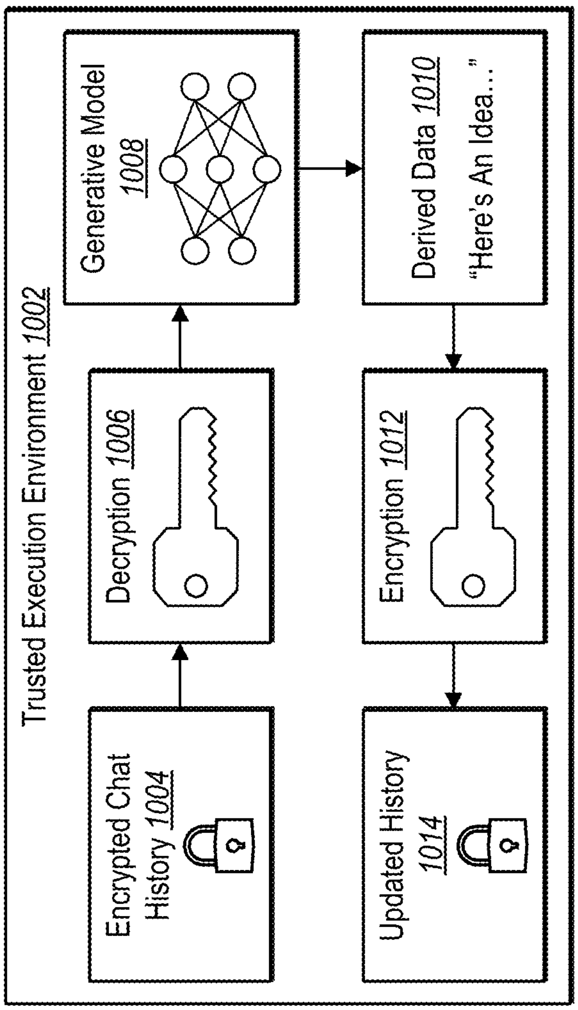
FIG. 10 illustrates the private inference system performing a background process to generate derived data in accordance with one or more embodiments.

Specifically, FIG. 10 shows the private inference system 120 operating a trusted execution environment 1002. Within the trusted execution environment 1002, the private inference system 120 can access encrypted chat history 1004 (e.g., the encrypted chat history 508 stored on the database 510, as described in connection with FIG. 5) and perform an act 1006 of decrypting the encrypted chat history 1004 within the trusted execution environment 1002. For example, the private inference system 120 uses a client-controlled storage encryption key to decrypt the encrypted chat history, including past chat messages and response content.

Moreover, in one or more embodiments, the private inference system 120 processes the decrypted chat history through a generative model 1008 (e.g., a large language model) to generate derived data 1010. For instance, the private inference system 120 provides plaintext of the past chat messages and response content to the generative model 1008 to generate derived data associated with the chat messages and/or the response content.

In one or more embodiments, the background processing illustrated in FIG. 10 corresponds to a deferred or asynchronous analysis of private chat history, sometimes referred to as "dreaming." In such embodiments, the private inference system 120 performs background processing separate from an active chat session to derive higher-level information from accumulated private chat history, such as summaries, topic representations, preferences, or other derived data. The private inference system 120 can limit plaintext access of chat history during such background processing to execution within the trusted execution environment 1002. Moreover, the private inference system 120 can provide the plaintext access of chat history on a temporary basis, after which the private inference system 120 deletes or re-encrypts the plaintext of the chat history. In this manner, the private inference system 120 can generate useful derived data while preserving privacy guarantees associated with private chat history.

In one or more embodiments, the private inference system 120 performs background processing of chat history in accordance with scheduling criteria or user preferences. For example, the private inference system 120 may perform background processing during periods of low system load, at predefined intervals, or in response to an explicit user request. In some embodiments, the client device provides consent for background processing of chat history, and the private inference system 120 performs such processing only at times when the consent remains valid. In one or more embodiments, if background processing of chat history is deferred or skipped due to user preferences, resource availability, or policy constraints, the private inference system 120 continues to operate without generating derived data, and private inference (as described extensively herein) remains functional without reliance on background processing results.

In one or more embodiments, background processing of chat history is limited to chat histories that remain in a private processing mode. For example, the private inference system 120 may refrain from performing background processing on chat messages generated after a conversation has transitioned to a non-private processing mode, unless explicitly authorized by the client device. This can help ensure that derived data generated during background processing reflects only chat history subject to private processing guarantees.

In addition, in some embodiments, the private inference system 120 performs an act 1012 of encrypting the derived data 1010 and storing the encrypted derived data with the encrypted chat history 1004 as an updated chat history 1014. For instance, the private inference system 120 updates the encrypted chat history by re-encrypting the chat history (e.g., chat messages with response content) and the derived data 1010. For example, the private inference system 120 uses the client-controlled storage encryption key to encrypt the derived data 1010.

In one or more embodiments, the private inference system 120 treats the derived data 1010 generated during background processing as private data associated with the corresponding chat history. For example, the derived data may be encrypted using the same client-controlled storage encryption key as the chat history and stored together with the encrypted chat messages. In some embodiments, the private inference system 120 may use the derived data 1010 to improve responsiveness or personalization for future private chat sessions, while keeping the derived data 1010 inaccessible outside of authorized processing within the trusted execution environment 1002.

Additionally, or alternatively, in one or more embodiments, background processing of encrypted chat history by the private inference system 120 includes execution of tasks associated with a private chat. For example, a task may correspond to an action, condition, or deferred operation derived from prior chat messages, such as monitoring for a specified event, performing a scheduled check, or generating a reminder or notification at a later time. In such embodiments, the private inference system 120 can store task definitions and associated data as part of the encrypted chat history. Moreover, the private inference system 120 decrypts and processes task data within the trusted execution environment 1002 during authorized background processing. Execution of tasks may occur asynchronously with respect to active chat sessions, and plaintext access to task-related data may be confined to the trusted execution environment 1002 and limited in duration to execution of the task.

The embodiments described herein are not intended to enumerate all possible security considerations or threat vectors associated with server-side execution environments. Instead, the described techniques focus on enabling private inference, private chat history, and controlled use of derived data, while leaving other aspects of system security to be addressed by complementary mechanisms or future enhancements.

Although multiple trusted execution environments are illustrated and described herein with reference to different figures (e.g., trusted execution environment 310, trusted execution environment 312, trusted execution environment 402, trusted execution environment 502, etc.), such descriptions are provided for explanatory purposes. In one or more embodiments, the trusted execution environments shown in the figures may correspond to the same trusted execution environment operating in different stages, configurations, or contexts of processing, or to multiple trusted execution environments operating cooperatively with each other. This disclosure is not limited to any particular number or arrangement of trusted execution environments.

Figure 11:
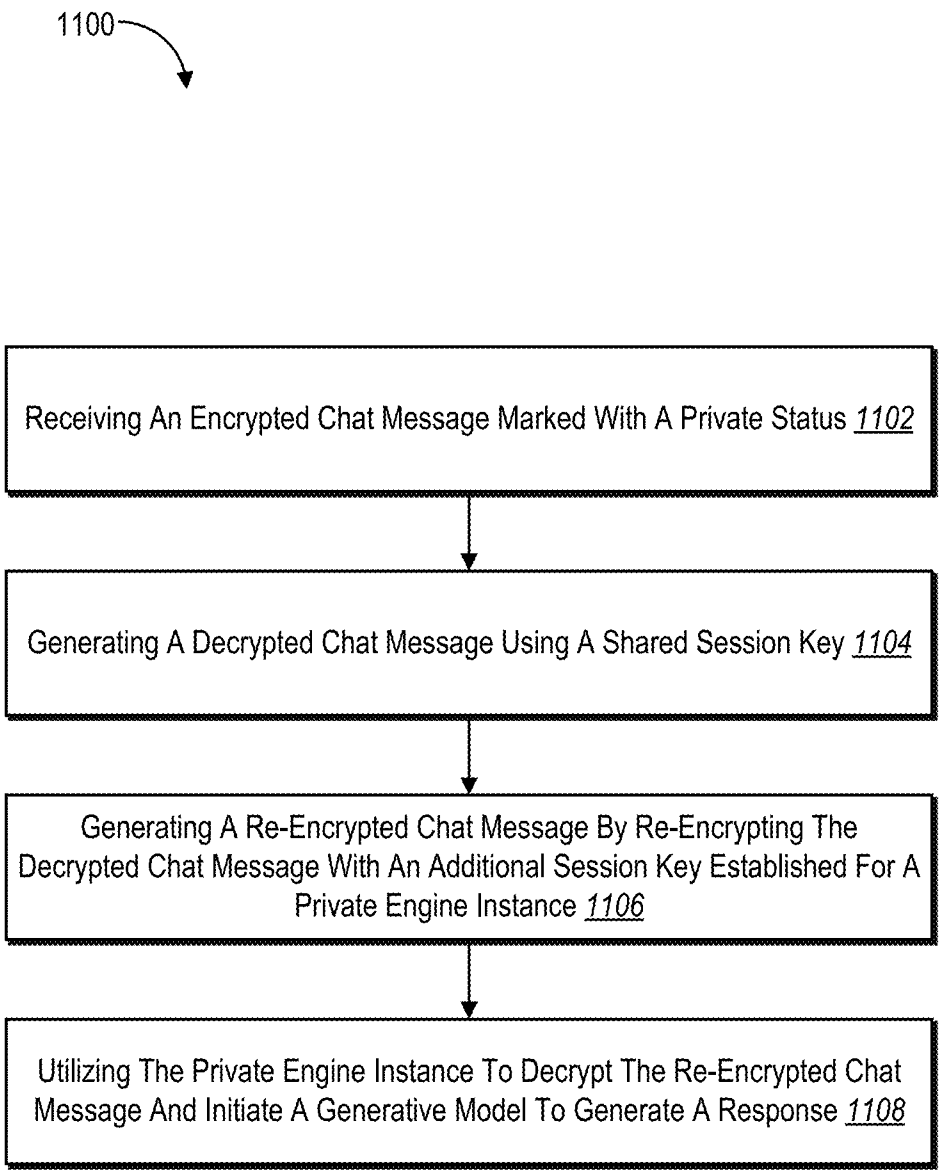
FIG. 11 illustrates a flowchart of a series of acts for executing one or more generative artificial intelligence models for private chat messages within protected inference environments in accordance with one or more embodiments.

FIGS. 1-10, the corresponding text, and the examples provide a number of different methods, systems, devices, and non-transitory computer-readable media of the private inference system 120. In addition to the foregoing, one or more embodiments are described in terms of flowcharts comprising acts for accomplishing a particular result, as shown in FIG. 11. In some implementations, the processes of the private inference system 120 are performed with more or fewer acts. Furthermore, in various implementations, the acts are performed in differing orders. Additionally, in some implementations, the acts described herein are repeated or performed in parallel with one another or in parallel with different instances of the same or similar acts.

As mentioned, FIG. 11 illustrates a flowchart of a series of acts 1100 for executing generative artificial intelligence models for private chat messages within protected inference environments in accordance with one or more implementations. While FIG. 11 illustrates acts according to one implementation, alternative implementations omit, add to, reorder, and/or modify any of the acts shown in FIG. 11. In one or more implementations, the acts of FIG. 11 are performed as part of a method (e.g., a computer-implemented method). Alternatively, in one or more implementations, a non-transitory computer-readable storage medium comprises instructions that, when executed by one or more processors, cause a computing device to perform the acts of FIG. 11. In some implementations, a system performs the acts of FIG. 11.

As shown in FIG. 11, the series of acts 1100 includes an act 1102 of receiving an encrypted chat message marked with a private status, an act 1104 of generating a decrypted chat message using a shared session key, an act 1106 of generating a re-encrypted chat message by re-encrypting the decrypted chat message with an additional session key established for a private engine instance, and an act 1108 of utilizing the private engine instance to decrypt the re-encrypted chat message and initiate a generative model to generate a response.

For example, the series of acts 1100 can include acts to perform any of the operations described in the following clauses:

CLAUSE 1. A computer-implemented method comprising:

receiving, from a client device in communication with a generative artificial intelligence (AI) system, an encrypted chat message marked with a private status;

generating a decrypted chat message by decrypting the encrypted chat message using a shared session key established at the client device based on a hardware-backed attestation indicating server-side processing by a trusted execution environment;

generating, using a secure enclave associated with the trusted execution environment, a re-encrypted chat message by re-encrypting the decrypted chat message with an additional session key established for a private engine instance; and utilizing the private engine instance operating in a confidential container to decrypt the re-encrypted chat message and initiate a generative model to generate a response corresponding to the encrypted chat message marked with the private status.

CLAUSE 2. The computer-implemented method of clause 1, wherein utilizing the private engine instance comprises executing a large language model within the trusted execution environment to generate a plaintext response based on plaintext tokens derived from decrypting the re-encrypted chat message, wherein the plaintext tokens and the plaintext response are inaccessible to the generative AI system outside of the trusted execution environment.

CLAUSE 3. The computer-implemented method of any of clauses 1-2, further comprising:

encrypting, using a client-controlled storage encryption key, at least a portion of the response for storage as encrypted chat history; and storing the encrypted chat history on a server without access to the client-controlled storage encryption key.

CLAUSE 4. The computer-implemented method of any of clauses 1-3, further comprising providing, by the trusted execution environment, the hardware-backed attestation to the client device as a cryptographic attestation indicating that the trusted execution environment is executing an audited version of server-side code.

CLAUSE 5. The computer-implemented method of any of clauses 1-4, further comprising:

receiving verification from the client device that the hardware-backed attestation is satisfactory for establishing a private chat between the client device and the generative AI system; and in response to receiving the verification, establishing the shared session key with the client device.

CLAUSE 6. The computer-implemented method of any of clauses 1-5, further comprising:

executing, within the trusted execution environment, a safety classification operation to determine a safety classification for plaintext of the chat message or the response;

based on the safety classification corresponding to a predefined safety condition, applying one or more restrictions to a user account associated with the client device, the one or more restrictions including at least one of suspending private chat functionality, rate-limiting subsequent requests, or disabling access to the generative AI system; and providing, for display via a graphical user interface of the client device, a notification indicating that a chat session associated with the chat message has been terminated.

CLAUSE 7. The computer-implemented method of any of clauses 1-6, further comprising generating synthetic data using the generative artificial intelligence system by:

aggregating, within the trusted execution environment, plaintext of a plurality of chat messages satisfying a predefined similarity threshold;

generating, using a large language model within the trusted execution environment, a synthetic message resembling the plurality of chat messages, while applying a differential privacy mechanism to limit contribution of individual chat messages from the plurality of chat messages to the generation of the synthetic message; and exporting the synthetic message to an external portion of the generative AI system outside of the trusted execution environment.

CLAUSE 8. The computer-implemented method of any of clauses 1-7, further comprising transitioning a conversation from a private processing mode to a non-private processing mode by:

determining that subsequent processing of the conversation is not eligible for execution within the trusted execution environment;

providing, for display via a graphical user interface of the client device, a notification indicating that the subsequent processing will continue outside of the trusted execution environment; and based on receiving an input from the client device indicating consent to transition to the non-private processing mode, processing subsequent chat messages or operations of the conversation outside of the trusted execution environment.

CLAUSE 9. The computer-implemented method of any of clauses 1-8, wherein:

receiving the encrypted chat message comprises receiving encrypted multimodal input including at least one of image data, audio data, or video data; and utilizing the private engine instance comprises executing the generative model within the trusted execution environment to process the multimodal input including at least one of the image data, the audio data, or the video data.

CLAUSE 10. A system comprising:

at least one processor; and a non-transitory computer-readable storage medium comprising instructions that, when executed by the at least one processor, cause the system to perform operations comprising:

receiving, from a client device in communication with a generative artificial intelligence (AI) system, an encrypted chat message marked with a private status;

generating a decrypted chat message by decrypting, within a trusted execution environment, the encrypted chat message using a first shared session key established between the client device and a server based on validation of a hardware-backed attestation indicating execution of trusted code within the trusted execution environment;

generating a re-encrypted chat message by re-encrypting, within the trusted execution environment, the decrypted chat message using a second session key established for secure communication with a private engine instance; and utilizing the private engine instance operating within a confidential container to decrypt the re-encrypted chat message and initiate a generative model to generate a response corresponding to the encrypted chat message marked with the private status.

CLAUSE 11. The system of clause 10, wherein the operations further comprise:

encrypting, using a client-controlled storage encryption key, response content for storage as encrypted chat history; and storing, on a server without access to the client-controlled storage encryption key, the encrypted chat history for subsequent retrieval of the response content.

CLAUSE 12. The system of any of clauses 10-11, wherein the operations further comprise:

providing, by the trusted execution environment, the hardware-backed attestation to the client device indicating execution of an audited version of server-side code within the trusted execution environment;

receiving confirmation from the client device that the hardware-backed attestation satisfies a trust criterion for private processing; and establishing the first shared session key after receiving the confirmation.

CLAUSE 13. The system of any of clauses 10-12, wherein the operations further comprise:

executing, within the trusted execution environment, a safety classification operation on plaintext associated with the encrypted chat message or the response; and based on the safety classification corresponding to a predefined safety condition, applying one or more restrictions to a user account associated with the client device, the one or more restrictions including at least one of suspending private chat functionality, rate-limiting subsequent requests, or disabling access to the generative AI system.

CLAUSE 14. The system of any of clauses 10-13, wherein the operations further comprise generating synthetic data by:

aggregating, within the trusted execution environment, plaintext from a plurality of chat messages satisfying a similarity criterion;

executing a large language model within the trusted execution environment to produce a synthetic message resembling the plurality of chat messages while applying a differential privacy mechanism to limit contribution of individual chat messages; and exporting the synthetic message for use outside the trusted execution environment.

CLAUSE 15. A non-transitory computer-readable storage medium comprising instructions that, when executed by at least one processor, cause a computing device to perform operations comprising:

receiving, from a client device in communication with a generative artificial intelligence (AI) system, an encrypted chat message marked with a private status;

decrypting, within a trusted execution environment, the encrypted chat message using a first session key shared between the client device and a server;

re-encrypting, within a secure enclave implemented by the trusted execution environment, the decrypted chat message using a second session key established for communication with a private engine instance; and utilizing the private engine instance operating within a confidential container to decrypt the re-encrypted chat message and initiate execution of a generative model to generate a response corresponding to the encrypted chat message marked with the private status.

CLAUSE 16. The non-transitory computer-readable storage medium of clause 15, wherein the operations further comprise:

encrypting, using a client-controlled storage encryption key, response content for storage as encrypted chat history; and storing the encrypted chat history on a server without access to the client-controlled storage encryption key such that plaintext of the response content is accessible to the generative AI system only during authorized processing within the trusted execution environment.

CLAUSE 17. The non-transitory computer-readable storage medium of any of clauses 15-16, wherein the operations further comprise performing a background processing operation using the generative AI system by:

decrypting, within the trusted execution environment and using the client-controlled storage encryption key, the encrypted chat history including the response content;

providing plaintext of the response content to the generative model to generate derived data associated with the response content; and updating the encrypted chat history by re-encrypting, using the client-controlled storage encryption key, the response content and the derived data.

CLAUSE 18. The non-transitory computer-readable storage medium of any of clauses 15-17, wherein the operations further comprise:

executing, within the trusted execution environment, a safety classification operation to determine a safety flag for plaintext of the chat message or the response; and based on the safety flag, applying one or more account-level restrictions to a user account associated with the client device.

CLAUSE 19. The non-transitory computer-readable storage medium of any of clauses 15-18, wherein the operations further comprise generating synthetic data by:

aggregating, within the trusted execution environment, plaintext from multiple chat messages satisfying a similarity criterion;

generating, using the generative model, a synthetic message that satisfies the similarity criterion with the multiple chat messages, while applying a differential privacy mechanism to limit contribution of individual chat messages from the multiple chat messages; and outputting the synthetic message for use outside the trusted execution environment.

CLAUSE 20. The non-transitory computer-readable storage medium of any of clauses 15-19, wherein the operations further comprise:

determining that subsequent processing of a conversation should be performed outside of the trusted execution environment;

providing, for display via a graphical user interface of the client device, a notification indicating continuation of the conversation outside of the trusted execution environment; and upon receiving consent from the client device, processing subsequent conversation operations outside of the trusted execution environment.

Embodiments of the present disclosure may comprise or utilize a special purpose or general purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some implementations, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network computers, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
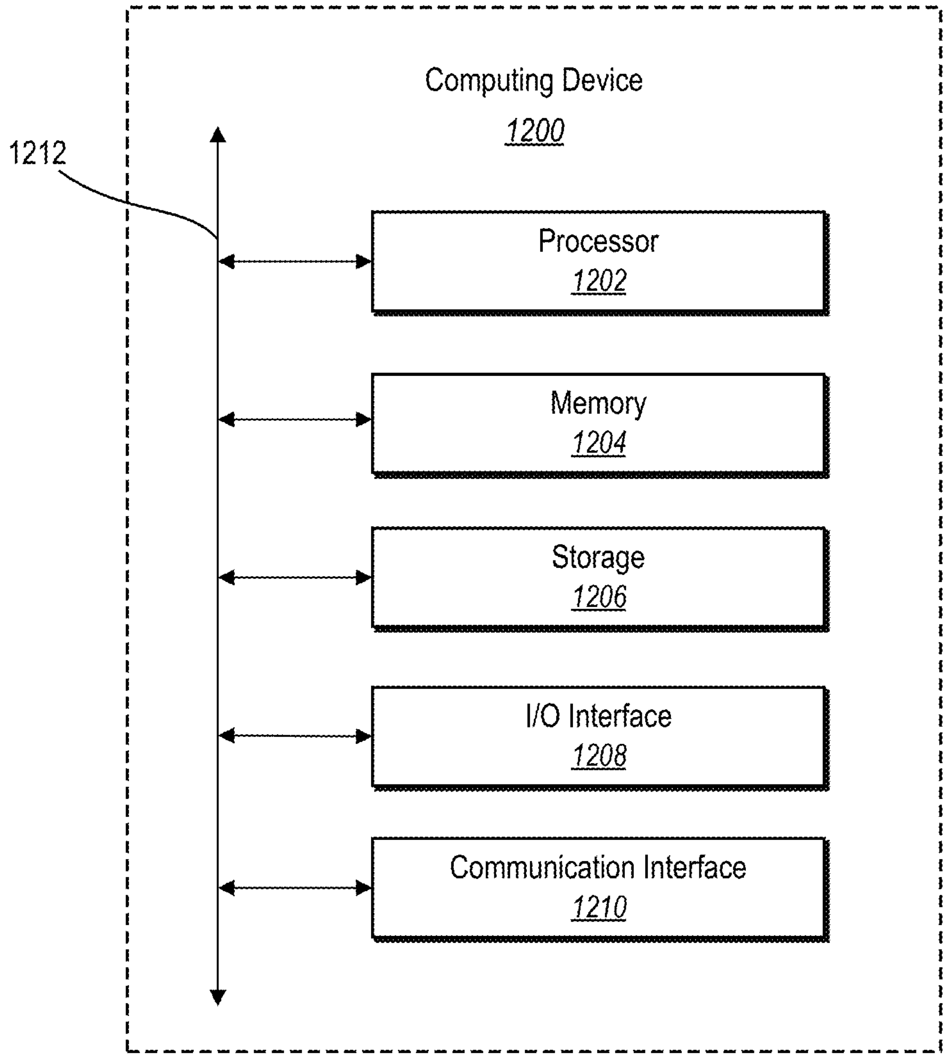
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200, may represent the computing devices described above (e.g., the server device(s) 202, the client device 210, etc.). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor 1202 includes hardware for executing instructions, such as those making up a computer program. As an example, and not by way of limitation, to execute instructions, the processor 1202 may retrieve (or fetch) the instructions from an internal register, an internal cache, memory 1204, or a storage device 1206 and decode and execute them.

The computing device 1200 includes the memory 1204, which is coupled to the processor 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes the storage device 1206 for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, a keypad, a keyboard, a touch screen, a camera, an optical scanner, a network interface, a modem, other known I/O devices, or a combination of such I/O interfaces.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include the bus 1212. The bus 1212 can include hardware, software, or both that connects components of computing device 1200 to each other.

Figure 13:
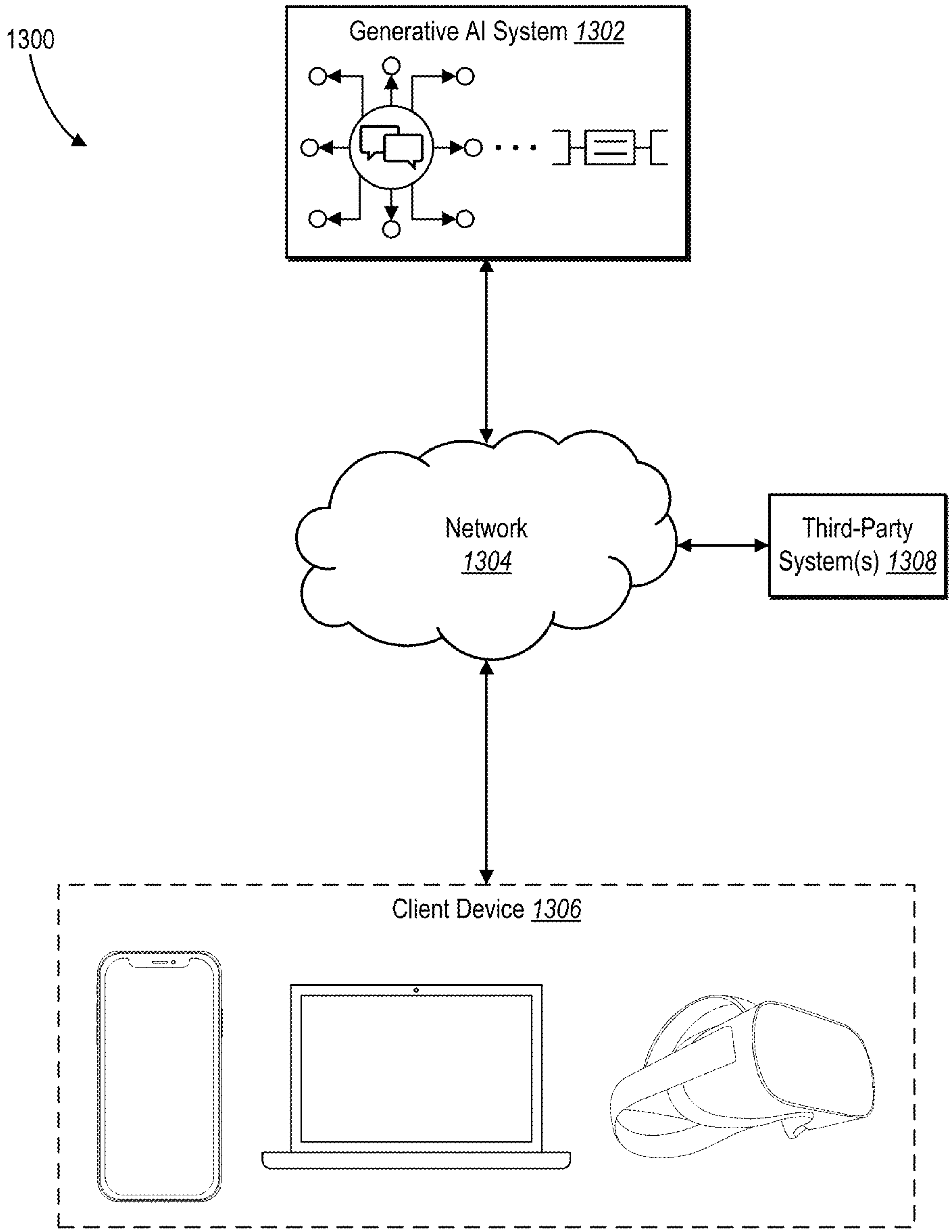
FIG. 13 illustrates a network environment of a generative artificial intelligence system in accordance with one or more embodiments.

FIG. 13 is a schematic diagram illustrating environment 1300 within which one or more implementations of the private inference system 120 can be implemented. For example, the private inference system 120 may be part of a generative AI system 1302 (e.g., the generative AI system 100). Generative AI system 1302 may generate, store, manage, receive, and send digital content (such as digital content items). For example, generative AI system 1302 may send and receive digital content to and from client devices 1306 by way of network 1304. In particular, generative AI system 1302 can store and manage a collection of digital content. Generative AI system 1302 can manage the sharing of digital content between computing devices associated with a plurality of users. For instance, generative AI system 1302 can facilitate a user sharing a digital content item with another user of generative AI system 1302.

In particular, generative AI system 1302 can manage synchronizing digital content across multiple client devices 1306 associated with one or more users. For example, a user may edit digital content using client device 1306. The generative AI system 1302 can cause client device 1306 to send the edited digital content to generative AI system 1302. Generative AI system 1302 then synchronizes the edited digital content on one or more additional computing devices.

In addition to synchronizing digital content across multiple devices, one or more implementations of generative AI system 1302 can provide an efficient storage option for users that have large collections of digital content. For example, generative AI system 1302 can store a collection of digital content on generative AI system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from generative AI system 1302. In particular, upon a user selecting a reduced-sized version of digital content, client device 1306 sends a request to generative AI system 1302 requesting the digital content associated with the reduced-sized version of the digital content. Generative AI system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access generative AI system 1302.

As illustrated, the generative AI system 1302 communicates with third-party system(s) 1308 by way of the network 1304. For example, the generative AI system 1302 generates computer code or scripts for execution by the third-party system(s) 1308 as part of generating an output. In some cases, the generative AI system 1302 integrates subcomponents or features of the third-party system(s) 1308 using APIs or other integrations. The third-party system(s) 1308 can include systems housed and operated on servers separate from the generative AI system 1302, such as data management systems, calendaring systems, social networking systems, search engine systems, and/or other computer systems.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device in communication with a generative artificial intelligence (AI) system, an encrypted chat message marked with a private status;

generating a decrypted chat message by decrypting the encrypted chat message using a shared session key established at the client device based on a hardware-backed attestation indicating server-side processing by a trusted execution environment;

generating, using a secure enclave associated with the trusted execution environment, a re-encrypted chat message by re-encrypting the decrypted chat message with an additional session key established for a private engine instance; and utilizing the private engine instance operating in a confidential container to decrypt the re-encrypted chat message and initiate a generative model to generate a response corresponding to the encrypted chat message marked with the private status.

2. The computer-implemented method of claim 1, wherein utilizing the private engine instance comprises executing a large language model within the trusted execution environment to generate a plaintext response based on plaintext tokens derived from decrypting the re-encrypted chat message, wherein the plaintext tokens and the plaintext response are inaccessible to the generative AI system outside of the trusted execution environment.

3. The computer-implemented method of claim 1, further comprising:

encrypting, using a client-controlled storage encryption key, at least a portion of the response for storage as encrypted chat history; and storing the encrypted chat history on a server without access to the client-controlled storage encryption key.

4. The computer-implemented method of claim 1, further comprising providing, by the trusted execution environment, the hardware-backed attestation to the client device as a cryptographic attestation indicating that the trusted execution environment is executing an audited version of server-side code.

5. The computer-implemented method of claim 1, further comprising:

receiving verification from the client device that the hardware-backed attestation is satisfactory for establishing a private chat between the client device and the generative AI system; and in response to receiving the verification, establishing the shared session key with the client device.

6. The computer-implemented method of claim 1, further comprising:

executing, within the trusted execution environment, a safety classification operation to determine a safety classification for plaintext of the chat message or the response;

based on the safety classification corresponding to a predefined safety condition, applying one or more restrictions to a user account associated with the client device, the one or more restrictions including at least one of suspending private chat functionality, rate-limiting subsequent requests, or disabling access to the generative AI system; and providing, for display via a graphical user interface of the client device, a notification indicating that a chat session associated with the chat message has been terminated.

7. The computer-implemented method of claim 1, further comprising generating synthetic data using the generative artificial intelligence system by:

aggregating, within the trusted execution environment, plaintext of a plurality of chat messages satisfying a predefined similarity threshold;

generating, using a large language model within the trusted execution environment, a synthetic message resembling the plurality of chat messages, while applying a differential privacy mechanism to limit contribution of individual chat messages from the plurality of chat messages to the generation of the synthetic message; and exporting the synthetic message to an external portion of the generative AI system outside of the trusted execution environment.

8. The computer-implemented method of claim 1, further comprising transitioning a conversation from a private processing mode to a non-private processing mode by:

determining that subsequent processing of the conversation is not eligible for execution within the trusted execution environment;

providing, for display via a graphical user interface of the client device, a notification indicating that the subsequent processing will continue outside of the trusted execution environment; and based on receiving an input from the client device indicating consent to transition to the non-private processing mode, processing subsequent chat messages or operations of the conversation outside of the trusted execution environment.

9. The computer-implemented method of claim 1, wherein:

receiving the encrypted chat message comprises receiving encrypted multimodal input including at least one of image data, audio data, or video data; and utilizing the private engine instance comprises executing the generative model within the trusted execution environment to process the multimodal input including at least one of the image data, the audio data, or the video data.

10. A system comprising:

at least one processor; and a non-transitory computer-readable storage medium comprising instructions that, when executed by the at least one processor, cause the system to perform operations comprising:

receiving, from a client device in communication with a generative artificial intelligence (AI) system, an encrypted chat message marked with a private status;

generating a decrypted chat message by decrypting, within a trusted execution environment, the encrypted chat message using a first shared session key established between the client device and a server based on validation of a hardware-backed attestation indicating execution of trusted code within the trusted execution environment;

generating a re-encrypted chat message by re-encrypting, within the trusted execution environment, the decrypted chat message using a second session key established for secure communication with a private engine instance; and utilizing the private engine instance operating within a confidential container to decrypt the re-encrypted chat message and initiate a generative model to generate a response corresponding to the encrypted chat message marked with the private status.

11. The system of claim 10, wherein the operations further comprise:

encrypting, using a client-controlled storage encryption key, response content for storage as encrypted chat history; and storing, on a server without access to the client-controlled storage encryption key, the encrypted chat history for subsequent retrieval of the response content.

12. The system of claim 10, wherein the operations further comprise:

providing, by the trusted execution environment, the hardware-backed attestation to the client device indicating execution of an audited version of server-side code within the trusted execution environment;

receiving confirmation from the client device that the hardware-backed attestation satisfies a trust criterion for private processing; and establishing the first shared session key after receiving the confirmation.

13. The system of claim 10, wherein the operations further comprise:

executing, within the trusted execution environment, a safety classification operation on plaintext associated with the encrypted chat message or the response; and based on the safety classification corresponding to a predefined safety condition, applying one or more restrictions to a user account associated with the client device, the one or more restrictions including at least one of suspending private chat functionality, rate-limiting subsequent requests, or disabling access to the generative AI system.

14. The system of claim 10, wherein the operations further comprise generating synthetic data by:

aggregating, within the trusted execution environment, plaintext from a plurality of chat messages satisfying a similarity criterion;

executing a large language model within the trusted execution environment to produce a synthetic message resembling the plurality of chat messages while applying a differential privacy mechanism to limit contribution of individual chat messages; and exporting the synthetic message for use outside the trusted execution environment.

15. A non-transitory computer-readable storage medium comprising instructions that, when executed by at least one processor, cause a computing device to perform operations comprising:

receiving, from a client device in communication with a generative artificial intelligence (AI) system, an encrypted chat message marked with a private status;

decrypting, within a trusted execution environment, the encrypted chat message using a first session key shared between the client device and a server;

re-encrypting, within a secure enclave implemented by the trusted execution environment, the decrypted chat message using a second session key established for communication with a private engine instance; and utilizing the private engine instance operating within a confidential container to decrypt the re-encrypted chat message and initiate execution of a generative model to generate a response corresponding to the encrypted chat message marked with the private status.

16. The non-transitory computer-readable storage medium of claim 15, wherein the operations further comprise:

encrypting, using a client-controlled storage encryption key, response content for storage as encrypted chat history; and storing the encrypted chat history on a server without access to the client-controlled storage encryption key such that plaintext of the response content is accessible to the generative AI system only during authorized processing within the trusted execution environment.

17. The non-transitory computer-readable storage medium of claim 16, wherein the operations further comprise performing a background processing operation using the generative AI system by:

decrypting, within the trusted execution environment and using the client-controlled storage encryption key, the encrypted chat history including the response content;

providing plaintext of the response content to the generative model to generate derived data associated with the response content; and updating the encrypted chat history by re-encrypting, using the client-controlled storage encryption key, the response content and the derived data.

18. The non-transitory computer-readable storage medium of claim 15, wherein the operations further comprise:

executing, within the trusted execution environment, a safety classification operation to determine a safety flag for plaintext of the chat message or the response; and based on the safety flag, applying one or more account-level restrictions to a user account associated with the client device.

19. The non-transitory computer-readable storage medium of claim 15, wherein the operations further comprise generating synthetic data by:

aggregating, within the trusted execution environment, plaintext from multiple chat messages satisfying a similarity criterion;

generating, using the generative model, a synthetic message that satisfies the similarity criterion with the multiple chat messages, while applying a differential privacy mechanism to limit contribution of individual chat messages from the multiple chat messages; and outputting the synthetic message for use outside the trusted execution environment.

20. The non-transitory computer-readable storage medium of claim 15, wherein the operations further comprise:

determining that subsequent processing of a conversation should be performed outside of the trusted execution environment;

providing, for display via a graphical user interface of the client device, a notification indicating continuation of the conversation outside of the trusted execution environment; and upon receiving consent from the client device, processing subsequent conversation operations outside of the trusted execution environment.

* * * * *